(12) United States Patent
Shkedi

(10) Patent No.: US 11,805,300 B2
(45) Date of Patent: *Oct. 31, 2023

(54) SYSTEM FOR TAKING ACTION USING CROSS-DEVICE PROFILE INFORMATION

(71) Applicant: INTENT IQ, LLC, Long Island City, NY (US)

(72) Inventor: Roy Shkedi, Forest Hills, NY (US)

(73) Assignee: Intent IQ, LLC, Long Island City, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/110,857

(22) Filed: Feb. 16, 2023

(65) Prior Publication Data

US 2023/0199272 A1    Jun. 22, 2023

Related U.S. Application Data

(60) Continuation of application No. 17/877,870, filed on Jul. 29, 2022, now Pat. No. 11,589,136, which is a
(Continued)

(51) Int. Cl.
*H04N 21/81* (2011.01)
*G06F 16/951* (2019.01)
(Continued)

(52) U.S. Cl.
CPC ........ *H04N 21/812* (2013.01); *G06F 16/248* (2019.01); *G06F 16/951* (2019.01);
(Continued)

(58) Field of Classification Search
CPC .... H04N 21/812; G06F 16/951; G06F 16/248; H04N 21/5007; H04L 61/5007; G06Q 30/0241; G06Q 30/0251; G06Q 30/0255; G06Q 30/0256; G06Q 30/0269; H04L 12/66; H04L 67/306; H04N 21/25891; H04N 21/42684; H04N 21/44222; H04N 21/4532; H04N 21/6125; H04N 21/64322

See application file for complete search history.

(56) References Cited

U.S. PATENT DOCUMENTS 5,105,184 A    4/1992   Pirani et al.
5,220,655 A    6/1993   Tsutsui
(Continued)

FOREIGN PATENT DOCUMENTS

JP    2003-331183 A    11/2003
JP    2006-004441 A    1/2006
(Continued)

OTHER PUBLICATIONS

Bolcer, Gregory Alan et al.; Peer-to-Peer Architectures and the Magi™ Open-Source Infrastructure; Endeavors Technology, Inc.; Dec. 6, 2000.
(Continued)

*Primary Examiner* — Nnenna N Ekpo
(74) *Attorney, Agent, or Firm* — Louis J. Hoffman; David S. Alavi

(57) ABSTRACT

In a method for delivering targeted television advertisements based on online behavior, IP addresses indicating online access devices and IP addresses indicating television set-top boxes are electronically associated for a multitude of users. Using user profile information derived from online activity from one of the online access IP addresses, a television advertisement is selected, such as by using behavioral targeting or demographic information, and automatically directed to the set-top box indicated by the set-top IP address associated with that online access IP address. Preferably neither the user profile information nor the electronic association of online access and set-top box IP addresses includes personally identifiable information.

27 Claims, 18 Drawing Sheets

Related U.S. Application Data

(60) continuation of application No. 17/714,965, filed on Apr. 6, 2022, now Pat. No. 11,564,015, which is a continuation of application No. 16/925,655, filed on Jul. 10, 2020, now Pat. No. 11,303,973, which is a continuation of application No. 16/228,479, filed on Dec. 20, 2018, now Pat. No. 10,715,878, which is a continuation of application No. 15/803,631, filed on Nov. 3, 2017, now Pat. No. 10,178,442, which is a continuation of application No. 15/179,356, filed on Jun. 10, 2016, now Pat. No. 9,813,778, which is a continuation of application No. 14/246,525, filed on Apr. 7, 2014, now Pat. No. 9,369,779, which is a division of application No. 13/097,885, filed on Apr. 29, 2011, now Pat. No. 8,695,032, which is a division of application No. 12/860,666, filed on Aug. 20, 2010, now Pat. No. 8,281,336, which is a continuation of application No. 11/736,544, filed on Apr. 17, 2007, now Pat. No. 7,861,260.

(51) Int. Cl.

| | |
|---|---|
| *G06F 16/248* | (2019.01) |
| *H04L 61/5007* | (2022.01) |
| *H04L 12/66* | (2006.01) |
| *H04L 67/306* | (2022.01) |
| *H04N 21/258* | (2011.01) |
| *H04N 21/45* | (2011.01) |
| *H04N 21/61* | (2011.01) |
| *H04N 21/643* | (2011.01) |
| *G06Q 30/0241* | (2023.01) |
| *G06Q 30/0251* | (2023.01) |
| *H04N 21/442* | (2011.01) |
| *H04N 21/426* | (2011.01) |

(52) U.S. Cl.
CPC ....... *G06Q 30/0241* (2013.01); *G06Q 30/0251* (2013.01); *G06Q 30/0255* (2013.01); *G06Q 30/0256* (2013.01); *G06Q 30/0269* (2013.01); *H04L 12/66* (2013.01); *H04L 61/5007* (2022.05); *H04L 67/306* (2013.01); *H04N 21/25891* (2013.01); *H04N 21/42684* (2013.01); *H04N 21/44222* (2013.01); *H04N 21/44224* (2020.08); *H04N 21/4532* (2013.01); *H04N 21/6125* (2013.01); *H04N 21/64322* (2013.01)

(56) References Cited

U.S. PATENT DOCUMENTS

| | | | |
|---|---|---|---|
| 5,359,508 | A | 10/1994 | Rossides |
| 5,442,633 | A | 8/1995 | Perkins et al. |
| 5,572,643 | A | 11/1996 | Judson |
| 5,710,884 | A | 1/1998 | Dedrick |
| 5,724,424 | A | 3/1998 | Gifford |
| 5,724,521 | A | 3/1998 | Dedrick |
| 5,751,956 | A | 5/1998 | Kirsch |
| 5,774,670 | A | 6/1998 | Montulli |
| 5,794,210 | A | 8/1998 | Goldhaber et al. |
| 5,809,242 | A | 9/1998 | Shaw et al. |
| 5,819,092 | A | 10/1998 | Ferguson et al. |
| 5,819,285 | A | 10/1998 | Damico et al. |
| 5,835,718 | A | 11/1998 | Blewett |
| 5,835,896 | A | 11/1998 | Fisher et al. |
| 5,838,314 | A | 11/1998 | Neel et al. |
| 5,848,396 | A | 12/1998 | Gerace |
| 5,855,008 | A | 12/1998 | Goldhaber et al. |
| 5,870,546 | A | 2/1999 | Kirsch |
| 5,870,550 | A | 2/1999 | Wesinger, Jr. et al. |
| 5,901,287 | A | 5/1999 | Bull et al. |
| 5,918,014 | A | 6/1999 | Robinson |
| 5,933,811 | A | 8/1999 | Angles et al. |
| 5,937,390 | A | 8/1999 | Hyodo |
| 5,937,392 | A | 8/1999 | Alberts |
| 5,948,061 | A | 9/1999 | Merriman et al. |
| 5,959,623 | A | 9/1999 | van Hoff et al. |
| 5,963,915 | A | 10/1999 | Kirsch |
| 5,978,013 | A | 11/1999 | Jones et al. |
| 5,995,943 | A | 11/1999 | Bull et al. |
| 5,999,912 | A | 12/1999 | Wodarz et al. |
| 6,002,394 | A | 12/1999 | Schein et al. |
| 6,014,638 | A | 1/2000 | Burge et al. |
| 6,016,504 | A | 1/2000 | Arnold et al. |
| 6,018,768 | A | 1/2000 | Ullman et al. |
| 6,026,368 | A | 2/2000 | Brown et al. |
| 6,026,369 | A | 2/2000 | Capek |
| 6,026,374 | A | 2/2000 | Chess |
| 6,034,689 | A | 3/2000 | White et al. |
| 6,047,310 | A | 4/2000 | Kamakura et al. |
| 6,049,835 | A | 4/2000 | Gagnon |
| 6,055,573 | A | 4/2000 | Gardenswartz et al. |
| 6,073,241 | A | 6/2000 | Rosenberg et al. |
| 6,128,663 | A | 10/2000 | Thomas |
| 6,133,912 | A | 10/2000 | Montero |
| 6,134,532 | A | 10/2000 | Lazarus et al. |
| 6,157,946 | A | 12/2000 | Itakura et al. |
| 6,160,989 | A | 12/2000 | Hendricks et al. |
| 6,177,931 | B1 | 1/2001 | Alexander et al. |
| 6,188,398 | B1 | 2/2001 | Collins-Rector et al. |
| 6,189,008 | B1 | 2/2001 | Easty et al. |
| 6,205,432 | B1 | 3/2001 | Gabbard et al. |
| 6,216,112 | B1 | 4/2001 | Fuller et al. |
| 6,216,129 | B1 | 4/2001 | Eldering |
| 6,285,987 | B1 | 9/2001 | Roth et al. |
| 6,289,318 | B1 | 9/2001 | Barber |
| 6,308,202 | B1 | 10/2001 | Cohn et al. |
| 6,327,574 | B1 | 12/2001 | Kramer et al. |
| 6,366,298 | B1 | 4/2002 | Haitsuka et al. |
| 6,377,986 | B1 | 4/2002 | Philyaw et al. |
| 6,385,592 | B1 | 5/2002 | Angles et al. |
| 6,401,075 | B1 | 6/2002 | Mason et al. |
| 6,408,278 | B1 | 6/2002 | Carney et al. |
| 6,415,270 | B1 | 7/2002 | Rackson et al. |
| 6,446,261 | B1 | 9/2002 | Rosser |
| 6,449,657 | B2 | 9/2002 | Stanbach, Jr. et al. |
| 6,463,533 | B1 | 10/2002 | Calamera et al. |
| 6,463,585 | B1 | 10/2002 | Hendricks et al. |
| 6,490,587 | B2 | 12/2002 | Easty et al. |
| 6,536,041 | B1 | 3/2003 | Knudson et al. |
| 6,633,850 | B1 | 10/2003 | Gabbard et al. |
| 6,654,725 | B1 | 11/2003 | Langheinrich et al. |
| 6,684,194 | B1 | 1/2004 | Eldering et al. |
| 6,718,551 | B1 | 4/2004 | Swix et al. |
| 6,771,290 | B1 | 8/2004 | Hoyle |
| 6,810,527 | B1 | 10/2004 | Conrad et al. |
| 6,832,207 | B1 | 12/2004 | Shkedi |
| 6,837,436 | B2 | 1/2005 | Swartz et al. |
| 6,845,396 | B1 | 1/2005 | Kanojia et al. |
| 6,847,992 | B1 | 1/2005 | Haitsuka et al. |
| 6,868,392 | B1 | 3/2005 | Ogasawara |
| 6,907,566 | B1 | 6/2005 | McElfresh et al. |
| 6,915,271 | B1 | 7/2005 | Meyer et al. |
| 6,925,440 | B1 | 8/2005 | Shkedi |
| 6,973,436 | B1 | 12/2005 | Shkedi |
| 6,985,882 | B1 | 1/2006 | Del Sesto |
| 7,013,290 | B2 | 3/2006 | Ananian |
| 7,038,637 | B1 | 5/2006 | Eller et al. |
| 7,039,699 | B1 | 5/2006 | Narin et al. |
| 7,051,351 | B2 | 5/2006 | Goldman et al. |
| 7,062,469 | B2 | 6/2006 | Meyers et al. |
| 7,072,853 | B2 | 7/2006 | Shkedi |
| 7,092,926 | B2 | 8/2006 | Cerrato |
| 7,100,183 | B2 | 8/2006 | Kunkel et al. |
| 7,139,723 | B2 | 11/2006 | Conkwright et al. |
| 7,146,329 | B2 | 12/2006 | Conkwright et al. |
| 7,152,237 | B2 | 12/2006 | Flickinger et al. |
| 7,158,943 | B2 | 1/2007 | van der Riet |
| 7,188,085 | B2 | 3/2007 | Pelletier |
| 7,251,628 | B1 | 7/2007 | Edlund et al. |
| 7,260,823 | B2 | 8/2007 | Schlack et al. |
| 7,272,853 | B2 | 9/2007 | Goodman et al. |
| 7,299,195 | B1 | 11/2007 | Tawakol et al. |

(56) References Cited

U.S. PATENT DOCUMENTS

| | | | |
|---|---|---|---|
| 7,302,419 B2 | 11/2007 | Conkwright et al. |
| 7,305,459 B2 | 12/2007 | Klemba et al. |
| 7,356,045 B2 | 4/2008 | Satapati et al. |
| 7,376,714 B1 | 5/2008 | Gerken |
| 7,428,493 B2 | 9/2008 | Shkedi |
| 7,454,364 B2 | 11/2008 | Shkedi |
| 7,461,120 B1 | 12/2008 | Artz, Jr. et al. |
| 7,580,855 B2 | 8/2009 | Fernandes |
| 7,634,569 B2 | 12/2009 | VanAntwerp et al. |
| 7,640,214 B2 | 12/2009 | Black et al. |
| 7,747,745 B2 | 6/2010 | Shkedi |
| 7,756,744 B2 | 7/2010 | Schiff et al. |
| 7,761,558 B1 | 7/2010 | Jindal et al. |
| 7,805,332 B2 | 9/2010 | Wilson |
| 7,805,740 B2 | 9/2010 | Gilboa et al. |
| 7,806,329 B2 | 10/2010 | Dmitriev et al. |
| 7,822,637 B2 | 10/2010 | Shkedi |
| 7,822,639 B2 | 10/2010 | Shkedi |
| 7,843,923 B2 | 11/2010 | Baum |
| 7,853,255 B2 | 12/2010 | Karaoguz et al. |
| 7,856,372 B2 | 12/2010 | Ullah |
| 7,856,373 B2 | 12/2010 | Ullah |
| 7,861,260 B2 | 12/2010 | Shkedi |
| 7,890,609 B2 | 2/2011 | Shkedi |
| 7,894,448 B1 | 2/2011 | Lillibridge et al. |
| 7,899,862 B2 | 3/2011 | Appelman et al. |
| 7,908,645 B2 | 3/2011 | Varghese et al. |
| 7,913,275 B2 | 3/2011 | Hendricks et al. |
| 7,930,252 B2 | 4/2011 | Bender et al. |
| 7,937,383 B2 | 5/2011 | Hintze et al. |
| 7,958,224 B2 | 6/2011 | Amjadi |
| 7,962,603 B1 | 6/2011 | Morimoto |
| 7,966,647 B1 | 6/2011 | Igoe et al. |
| 7,971,260 B2 | 6/2011 | Spalink et al. |
| 7,979,307 B2 | 7/2011 | Shkedi |
| 8,015,184 B2 | 9/2011 | Zito et al. |
| 8,015,286 B2 | 9/2011 | Jenkins |
| 8,019,881 B2 | 9/2011 | Sandhu et al. |
| 8,024,765 B2 | 9/2011 | Ramanathan et al. |
| 8,037,506 B2 | 10/2011 | Cooper et al. |
| 8,040,819 B2 | 10/2011 | Harrington et al. |
| 8,051,444 B2 | 11/2011 | Shkedi |
| 8,079,048 B2 | 12/2011 | Howcroft |
| 8,086,491 B1 | 12/2011 | Matz et al. |
| 8,131,271 B2 | 3/2012 | Ramer et al. |
| 8,150,416 B2 | 4/2012 | Ribaudo et al. |
| 8,180,674 B2 | 5/2012 | Madhavan |
| 8,200,822 B1 | 6/2012 | Shkedi |
| 8,204,783 B2 | 6/2012 | Shkedi |
| 8,204,965 B2 | 6/2012 | Shkedi |
| 8,239,264 B2 | 8/2012 | Shkedi |
| 8,239,887 B2 | 8/2012 | Gilboa et al. |
| 8,244,574 B2 | 8/2012 | Shkedi |
| 8,244,582 B2 | 8/2012 | Shkedi |
| 8,244,583 B2 | 8/2012 | Shkedi |
| 8,244,586 B2 | 8/2012 | Shkedi |
| 8,280,758 B2 | 10/2012 | Shkedi |
| 8,296,437 B2 | 10/2012 | Pankratov |
| 8,352,980 B2 | 1/2013 | Howcroft |
| 8,402,356 B2 | 3/2013 | Martinez et al. |
| 8,468,578 B1 | 6/2013 | Lu et al. |
| 8,494,904 B2 | 7/2013 | Shkedi |
| 8,566,164 B2 | 10/2013 | Shkedi et al. |
| 8,589,210 B2 | 11/2013 | Shkedi |
| 8,595,069 B2 | 11/2013 | Shkedi et al. |
| 8,600,815 B2 | 12/2013 | Shkedi |
| 8,607,267 B2 | 12/2013 | Shkedi |
| 8,621,064 B2 | 12/2013 | Campbell et al. |
| 8,683,502 B2 | 3/2014 | Shkedi et al. |
| 8,700,464 B1 | 4/2014 | McAllister et al. |
| 8,713,600 B2 | 4/2014 | Shkedi |
| 8,725,571 B2 | 5/2014 | McAllister et al. |
| 8,762,201 B1 | 6/2014 | Noonan |
| 8,775,249 B2 | 7/2014 | Shkedi |
| 8,880,677 B2 | 11/2014 | Julia et al. |
| 8,959,146 B2 | 2/2015 | Shkedi |
| 8,997,138 B2 | 3/2015 | Shkedi |
| 9,071,886 B2 | 6/2015 | Shkedi |
| 9,078,035 B2 | 7/2015 | Shkedi et al. |
| 9,083,853 B2 | 7/2015 | Shkedi |
| 9,110,903 B2 | 8/2015 | Martinez et al. |
| 9,131,282 B2 | 9/2015 | Shkedi |
| 9,208,514 B2 | 12/2015 | Shkedi |
| 9,226,019 B2 | 12/2015 | Shkedi |
| 9,271,024 B2 | 2/2016 | Shkedi et al. |
| 9,351,053 B2 | 5/2016 | Shkedi |
| 9,369,779 B2 | 6/2016 | Shkedi |
| 9,495,682 B2 | 11/2016 | Vallier et al. |
| 9,508,089 B2 | 11/2016 | Shkedi |
| 9,571,865 B2 | 2/2017 | Shkedi |
| 9,591,380 B2 | 3/2017 | Shkedi et al. |
| 9,756,372 B2 | 9/2017 | Shkedi |
| 9,800,917 B2 | 10/2017 | Shkedi |
| 9,813,778 B2 | 11/2017 | Shkedi |
| 9,830,615 B2 | 11/2017 | Shkedi |
| 10,009,636 B2 | 6/2018 | Shkedi |
| 10,026,100 B2 | 7/2018 | Shkedi |
| 10,134,054 B2 | 11/2018 | Shkedi |
| 10,178,442 B2 | 1/2019 | Shkedi |
| 10,306,282 B2 | 5/2019 | Shkedi |
| 10,321,198 B2 | 6/2019 | Shkedi et al. |
| 10,405,058 B2 | 9/2019 | Shkedi et al. |
| 10,475,073 B2 | 11/2019 | Shkedi |
| 10,628,857 B2 | 4/2020 | Shkedi |
| 10,645,438 B2 | 5/2020 | Shkedi |
| 10,715,878 B2 | 7/2020 | Shkedi |
| 10,771,860 B2 | 9/2020 | Shkedi et al. |
| 10,839,423 B2 | 11/2020 | Shkedi |
| 10,984,445 B2 | 4/2021 | Shkedi |
| 11,082,753 B2 | 8/2021 | Shkedi et al. |
| 11,093,970 B2 | 8/2021 | Shkedi |
| 11,301,898 B2 | 4/2022 | Shkedi |
| 11,303,973 B2 | 4/2022 | Shkedi |
| 11,368,763 B2 | 6/2022 | Shkedi et al. |
| 11,564,015 B2 | 1/2023 | Shkedi |
| 11,589,136 B2 | 2/2023 | Shkedi |
| 2001/0020242 A1 | 9/2001 | Gupta et al. |
| 2001/0034646 A1 | 10/2001 | Hoyt et al. |
| 2001/0042002 A1 | 11/2001 | Koopersmith |
| 2001/0049620 A1* | 12/2001 | Blasko ............ G06Q 30/0207 705/14.1 |
| 2002/0010653 A1* | 1/2002 | Lee ............... G06Q 30/06 709/206 |
| 2002/0010928 A1 | 1/2002 | Sahota |
| 2002/0013943 A1 | 1/2002 | Haberman et al. |
| 2002/0019769 A1 | 2/2002 | Barritz et al. |
| 2002/0032603 A1 | 3/2002 | Yeiser |
| 2002/0046105 A1 | 4/2002 | Gardenswartz et al. |
| 2002/0049968 A1 | 4/2002 | Wilson et al. |
| 2002/0059094 A1 | 5/2002 | Hosea et al. |
| 2002/0059602 A1 | 5/2002 | Macrae et al. |
| 2002/0078444 A1 | 6/2002 | Krewin et al. |
| 2002/0082910 A1 | 6/2002 | Kontogouris |
| 2002/0082923 A1 | 6/2002 | Merriman et al. |
| 2002/0083043 A1 | 6/2002 | Hoshi et al. |
| 2002/0103850 A1 | 8/2002 | Moyer et al. |
| 2002/0104086 A1 | 8/2002 | Tomsen et al. |
| 2002/0112013 A1 | 8/2002 | Walsh |
| 2002/0116313 A1 | 8/2002 | Detering |
| 2002/0120933 A1 | 8/2002 | Knudson et al. |
| 2002/0120935 A1 | 8/2002 | Huber et al. |
| 2002/0123928 A1 | 9/2002 | Eldering et al. |
| 2002/0124249 A1 | 9/2002 | Shintani et al. |
| 2002/0124253 A1 | 9/2002 | Eyer et al. |
| 2002/0129362 A1 | 9/2002 | Chang et al. |
| 2002/0129368 A1 | 9/2002 | Schlack et al. |
| 2002/0133490 A1* | 9/2002 | Conkwright et al. .................... G06Q 30/0277 707/999.009 |
| 2002/0147645 A1 | 10/2002 | Alao et al. |
| 2002/0194058 A1 | 12/2002 | Eldering |
| 2002/0194604 A1 | 12/2002 | Sanchez et al. |
| 2003/0023481 A1 | 1/2003 | Calvert et al. |
| 2003/0041156 A1 | 2/2003 | Pickover et al. |
| 2003/0050863 A1 | 3/2003 | Radwin |
| 2003/0051242 A1 | 3/2003 | Donnelly |
| 2003/0066078 A1 | 4/2003 | Bjorgan et al. |
| 2003/0093311 A1 | 5/2003 | Knowlson |

(56) References Cited

U.S. PATENT DOCUMENTS

| | | |
|---|---|---|
| 2003/0126597 A1 | 7/2003 | Darby et al. |
| 2003/0131355 A1 | 7/2003 | Berenson et al. |
| 2003/0145323 A1 | 7/2003 | Hendricks et al. |
| 2003/0149975 A1 | 8/2003 | Eldering et al. |
| 2003/0187726 A1 | 10/2003 | Bull et al. |
| 2003/0187949 A1 | 10/2003 | Bhatt et al. |
| 2003/0207685 A1 | 11/2003 | Rankin |
| 2003/0208756 A1 | 11/2003 | Macrae et al. |
| 2003/0208758 A1 | 11/2003 | Schein et al. |
| 2003/0226141 A1 | 12/2003 | Krasnow et al. |
| 2003/0229893 A1 | 12/2003 | Sgaraglino |
| 2003/0229900 A1 | 12/2003 | Reisman |
| 2003/0231207 A1 | 12/2003 | Huang |
| 2004/0002938 A1 | 1/2004 | Deguchi |
| 2004/0003406 A1 | 1/2004 | Billmaier |
| 2004/0010546 A1 | 1/2004 | Klug et al. |
| 2004/0031058 A1 | 2/2004 | Reisman |
| 2004/0044566 A1 | 3/2004 | Bostelmann et al. |
| 2004/0073915 A1 | 4/2004 | Dureau |
| 2004/0078809 A1 | 4/2004 | Drazin |
| 2004/0107287 A1 | 6/2004 | Ananda et al. |
| 2004/0107437 A1 | 6/2004 | Reichardt et al. |
| 2004/0117827 A1 | 6/2004 | Karaoguz et al. |
| 2004/0123314 A1 | 6/2004 | Bova |
| 2004/0133689 A1 | 7/2004 | Vasisht |
| 2004/0147265 A1 | 7/2004 | Kelley et al. |
| 2004/0163101 A1 | 8/2004 | Swix et al. |
| 2004/0172650 A1 | 9/2004 | Hawkins et al. |
| 2004/0215515 A1 | 10/2004 | Perry |
| 2005/0021387 A1 | 1/2005 | Gottfurcht |
| 2005/0049957 A1 | 3/2005 | Vakili et al. |
| 2005/0076393 A1 | 4/2005 | Sussman |
| 2005/0086109 A1 | 4/2005 | McFadden et al. |
| 2005/0086112 A1 | 4/2005 | Shkedi |
| 2005/0096978 A1 | 5/2005 | Black |
| 2005/0108091 A1 | 5/2005 | Sotak et al. |
| 2005/0125289 A1 | 6/2005 | Beyda et al. |
| 2005/0125290 A1 | 6/2005 | Beyda et al. |
| 2005/0132405 A1 | 6/2005 | AbiEzzi et al. |
| 2005/0160002 A1 | 7/2005 | Roetter et al. |
| 2005/0165638 A1 | 7/2005 | Piller |
| 2005/0165643 A1 | 7/2005 | Wilson et al. |
| 2005/0165644 A1 | 7/2005 | Beyda et al. |
| 2005/0177420 A1 | 8/2005 | Tanahashi |
| 2005/0187823 A1 | 8/2005 | Howes |
| 2005/0278731 A1 | 12/2005 | Cameron et al. |
| 2006/0018466 A1 | 1/2006 | Adelstein et al. |
| 2006/0069616 A1 | 3/2006 | Bau |
| 2006/0116924 A1 | 6/2006 | Angles et al. |
| 2006/0137015 A1 | 6/2006 | Fahrny et al. |
| 2006/0184989 A1 | 8/2006 | Slothouber |
| 2006/0229930 A9 | 10/2006 | Gottfurcht |
| 2006/0242294 A1 | 10/2006 | Damick et al. |
| 2006/0253323 A1 | 11/2006 | Phan et al. |
| 2006/0259357 A1 | 11/2006 | Chiu |
| 2006/0271690 A1 | 11/2006 | Banga et al. |
| 2006/0271953 A1 | 11/2006 | Jacoby et al. |
| 2006/0271959 A1 | 11/2006 | Jacoby et al. |
| 2006/0287915 A1 | 12/2006 | Starr et al. |
| 2007/0027901 A1 | 2/2007 | Chan et al. |
| 2007/0030824 A1 | 2/2007 | Ribaudo et al. |
| 2007/0038516 A1 | 2/2007 | Apple et al. |
| 2007/0039020 A1 | 2/2007 | Cansler et al. |
| 2007/0061331 A1 | 3/2007 | Ramer et al. |
| 2007/0061838 A1 | 3/2007 | Grubbs et al. |
| 2007/0067459 A1 | 3/2007 | Baal-Haness |
| 2007/0073585 A1 | 3/2007 | Apple et al. |
| 2007/0078774 A1 | 4/2007 | Brown |
| 2007/0078849 A1 | 4/2007 | Slothouber |
| 2007/0088603 A1 | 4/2007 | Jouppi et al. |
| 2007/0089127 A1 | 4/2007 | Flickinger et al. |
| 2007/0100690 A1 | 5/2007 | Hopkins |
| 2007/0130015 A1 | 6/2007 | Starr et al. |
| 2007/0157228 A1 | 7/2007 | Bayer et al. |
| 2007/0157247 A1 | 7/2007 | Cordray et al. |
| 2007/0198327 A1 | 8/2007 | Yazdani et al. |
| 2007/0208619 A1 | 9/2007 | Branam et al. |
| 2007/0208789 A1 | 9/2007 | Reichman |
| 2007/0214048 A1 | 9/2007 | Chan et al. |
| 2007/0220553 A1 | 9/2007 | Branam et al. |
| 2007/0233571 A1 | 10/2007 | Eldering et al. |
| 2007/0244750 A1 | 10/2007 | Grannan et al. |
| 2007/0260514 A1 | 11/2007 | Burdick et al. |
| 2007/0266403 A1 | 11/2007 | Ou et al. |
| 2007/0277220 A1 | 11/2007 | Shikuma et al. |
| 2007/0283384 A1* | 12/2007 | Haeuser et al. ........ H04N 7/165 725/35 |
| 2007/0294721 A1 | 12/2007 | Haeuser et al. |
| 2008/0016540 A1 | 1/2008 | Savoor et al. |
| 2008/0040742 A1* | 2/2008 | Howcroft et al. .. H04N 21/6582 725/35 |
| 2008/0046942 A1 | 2/2008 | Merlin |
| 2008/0052392 A1 | 2/2008 | Webster et al. |
| 2008/0059300 A1 | 3/2008 | Hamoui |
| 2008/0082413 A1 | 4/2008 | Madhavan |
| 2008/0109306 A1 | 5/2008 | Maigret et al. |
| 2008/0109376 A1 | 5/2008 | Walsh et al. |
| 2008/0109843 A1 | 5/2008 | Ullah |
| 2008/0113674 A1 | 5/2008 | Baig |
| 2008/0120178 A1 | 5/2008 | Martinez et al. |
| 2008/0155613 A1 | 6/2008 | Benya et al. |
| 2008/0181225 A1 | 7/2008 | Zampiello |
| 2008/0183573 A1 | 7/2008 | Muschetto |
| 2008/0189360 A1 | 8/2008 | Kiley et al. |
| 2008/0195664 A1 | 8/2008 | Maharajh et al. |
| 2008/0201772 A1 | 8/2008 | Mondaeev et al. |
| 2008/0222283 A1* | 9/2008 | Ertugrul et al. ..... H04L 67/535 709/224 |
| 2008/0243822 A1 | 10/2008 | Campbell et al. |
| 2008/0244076 A1 | 10/2008 | Shah et al. |
| 2008/0255944 A1 | 10/2008 | Shah et al. |
| 2008/0262901 A1 | 10/2008 | Banga et al. |
| 2008/0263633 A1 | 10/2008 | Banga et al. |
| 2008/0275785 A1 | 11/2008 | Altberg et al. |
| 2008/0281697 A1 | 11/2008 | Whitehead |
| 2008/0307112 A1 | 12/2008 | Andreasson et al. |
| 2009/0037949 A1 | 2/2009 | Birch |
| 2009/0049469 A1 | 2/2009 | Small et al. |
| 2009/0106100 A1 | 4/2009 | Mashinsky |
| 2009/0171780 A1 | 7/2009 | Aldrey et al. |
| 2009/0172723 A1 | 7/2009 | Shkedi et al. |
| 2009/0204706 A1 | 8/2009 | Ertugrul et al. |
| 2010/0076848 A1 | 3/2010 | Stefanik et al. |
| 2010/0211636 A1 | 8/2010 | Starkenburg et al. |
| 2011/0035256 A1 | 2/2011 | Shkedi et al. |
| 2011/0040607 A1 | 2/2011 | Shkedi |
| 2011/0125592 A1 | 5/2011 | Mesaros |
| 2011/0167043 A1 | 7/2011 | Hintze et al. |
| 2011/0258049 A1 | 10/2011 | Ramer et al. |
| 2011/0307548 A1 | 12/2011 | Fisk et al. |
| 2013/0254035 A1 | 9/2013 | Ramer et al. |
| 2022/0109919 A1 | 4/2022 | Shkedi et al. |
| 2022/0368999 A1 | 11/2022 | Shkedi |

FOREIGN PATENT DOCUMENTS

| | | |
|---|---|---|
| JP | 2007053639 A | 3/2007 |
| JP | 2007-274246 A | 10/2007 |
| KR | 10-0793513 B1 | 1/2008 |
| KR | 10-2009-0113456 B1 | 8/2012 |
| WO | 1997/021183 A1 | 6/1997 |
| WO | 1999/057660 A1 | 11/1999 |
| WO | 2000/004709 A1 | 1/2000 |
| WO | 2001/054034 A1 | 7/2001 |
| WO | 2001/084440 A1 | 11/2001 |
| WO | 2004/086680 A1 | 10/2004 |
| WO | 2005/046237 A1 | 5/2005 |
| WO | 2007/117613 A1 | 10/2007 |

OTHER PUBLICATIONS

"180Solutions Launches All-In-One Online Ad Solution - Metricsdirect Outperforms Conventional Cost-Per-Click Models"; from www.zango.com; Mar. 30, 2004.

"BskyB in Google Link-up"; Financial Times (FT.com); Dec. 6, 2006.

(56) References Cited

OTHER PUBLICATIONS

"Cable's Big Bet On Hyper-Targeting. Time Warner will test new software that sends different ads to different viewers."; Business-Wire online; Jul. 4, 2005.
"Comcast, Cox Buy Interactive TV Company"; from Yahoo.com Financial News; Jul. 13, 2005.
"Comcast, Time Warner Cable hopeful on network DVRs"; from www.reuters.com; Mar. 30, 2006.
"DoubleClick Launches New Marketing Solutions"; from website www.clickz.com; Oct. 6, 1998.
"Google moves into TV ads with BskyB Deal"; Guardian Unlimited; Dec. 7, 2006.
"LookSmart and NetZero Extend and Enhance Winning Partnership"; press release found on www.shareholder.com; Feb. 9, 2000.
"Medio Systems to Launch Mobile Performance Ad Network - Search and recommendation technologies propel advancements in mobile advertising", article from Mobilestreams website, Mar. 19, 2007.
"NetZero and Juno's sophisticated targeting capabilities enable advertisers to hit an exact audience of qualified consumers"; from www.untd.com; 2007.
"NetZero Launches Ad-Backed Access Service"; from website www.clickz. com; Oct. 20, 1998.
"This Ad's for You -- Just You"; Businessweek online; Jun. 28, 2005.
"TiVo and Brightcove Partner to Deliver Broadband Content to TiVo Subscribers; press release from www.tivo.com; May 10, 2006.
"TiVo Announces First Advertising Search Product for Television"; press release from www.tivo.com; Nov. 28, 2005.
"TiVo Begins Rollout of Online Services Now Accessible Directly on the TV"; press release from www.tivo.com; Dec. 1, 2005.
"TiVo Debuts New Lexus Car Configuration Application"; press release from www.tivo.com; May 11, 2006.
"TiVo Launches New Interactive Advertising Technology"; press release from www.tivo.com; Jul. 18, 2005.
"TiVo Launches Television's New Advertising Search Product"; press release from www.tivo.com; May 8, 2006.
"Tivo to Insert Ads At End of Probrams"; The Wall Street Journal Online; Nov. 28, 2006.
"Venture Market Summary"; VentureWire Alert; Mar. 29, 2005.
"Visible World Targets Advertising Industry"; from http://informitv.com; Feb. 20, 2005.
"What's New: The Latest On Technology Deals"; from Dow Jones VentureWire; as published on Wall Street Journal Online; Oct. 22, 2007.
24/7 RealMedia, The Science of Digital Marketing, Company Overview (2007).
Aaddzz Brochure, Information Access Technologies, Inc. (1997). aaddzz.com webpages from www.archive.org, archived Jan. 30, 1998.
Ad-Star.com website archive from www.archive.org (archived on Apr. 12, 1997 and Feb. 1, 1997).
Adforce, Inc., Quick Reference Guide, Version 3.0 (1999).
Adforce, Inc., User Guide, A Complete Guide to Adforce, Version 2.6 (1998).
Adknowledge, Campaign Manager-Quick Reference Card (1996).
Admanagerpro; Ad Entry Manual; User's Manual V.1.05; 1997.
Admanagerpro; Ad Entry Manual; User's Manual V.2.0; 1997.
Admanagerpro; Administration and Receivables Manual; Administrator's Manual Version 1.0.5; Nov. 1997.
Admanagerpro; Administration and Receivables Manual; Administrator's Manual Version 2.0; Jun. 1998.
Advertising Age, "Digital Media Masters; Kevin O'Connor; Doubleclick" (Sep. 23, 1996).
Advertising-A Unified Approach to Adverstising Management, Baseview Products, Inc. brochure, Oct. 14, 1999.
Adya, Atul et al.; Analyzing the Browse Patterns of Mobile Clients; Microsoft Research; Nov. 1, 2001.
Aggarwal, Charu C. et al.; A Framework for the Optimizing of WWW Advertising; Jun. 3, 1998.

Angwin, Julia, Focalink Will Monitor World of Online Ads, San Francisco Chronicle, Feb. 7, 1996.
Archived website pages from http://www.doubleclick.com (Apr. 27, 2006).
Archived website pages from http://www.doubleclick.com (Apr. 28, 2006).
Archived website pages from http://www.doubleclick.com (Aug. 10, 2005).
Archived website pages from http://www.doubleclick.com (Aug. 28, 2006).
Archived website pages from http://www.doubleclick.com (Feb. 28, 2006).
Archived website pages from http://www.doubleclick.com (Jan. 23, 2005).
Archived website pages from http://www.doubleclick.com (Jul. 16, 2005).
Archived website pages from http://www.doubleclick.com (Jul. 17, 2005).
Archived website pages from http://www.doubleclick.com (Jul. 18, 2005).
Archived website pages from http://www.doubleclick.com (Jul. 28, 2005).
Archived website pages from http://www.doubleclick.com (Jul. 8, 1998).
Archived website pages from http://www.doubleclick.com (May 13, 2006).
Archived website pages from http://www.doubleclick.com (May 27, 2006).
Archived website pages from http://www.doubleclick.com (Nov. 27, 2005).
Archived website pages from http://www.doubleclick.com (Sep. 1, 2006).
Archived website pages from http://www.doubleclick.com (Sep. 24, 2005).
Archived website pages from http://www.doubleclick.com/uk (Jul. 8, 1998).
Archived website pages from http://www.doubleclick.net (Aug. 15, 2000).
Archived website pages from http://www.doubleclick.net (Aug. 17, 2000).
Archived website pages from http://www.doubleclick.net (Dec. 2, 1998).
Archived website pages from http://www.doubleclick.net (Feb. 29, 2000).
Archived website pages from http://www.doubleclick.net (Feb. 5, 1998).
Archived website pages from http://www.doubleclick.net (Mar. 2, 2000).
Archived website pages from http://www.jambo.net (Dec. 29, 2005).
Archived website pages from http://www.jambo.net (Feb. 8, 2006).
Archived website pages from http://www.xbox.com (Feb. 2007).
Archived website pages re: xbox from http://research.microsoft.com (Feb. 8, 2007).
Archived website pages re:xbox from http://support.microsoft.com (Oct. 17, 2007).
ATIS IPTV Exploratory Group Report and Recommendation to the TOPS Council; Alliance for Telecommunications Industry Solutions; Jul. 2005.
avenuea.com webpage, FAQ, www.avenuea.com/corpinfo/faq.html, archived Oct. 2, 1999.
Bae, Sung Min et al.; Fuzzy Web Ad Selector Based on Web Usage Mining; IEEE Intelligent Systems; 2003.
Baek et al., Implementation of Smart Home Control using Labview and PDA," IEEE (2004).
Baker, Loren; Behavioral Targeting and Contextual Advertizing; Search Engine Journal; Sep. 1, 2004.
Bakos, The Emerging Role of Electronic Marketplaces on the Internet, Communications of the ACM, Vol. 41, No. 8, Aug. 1998.
Bardram et al., Experiences from Real-World Deployment of Context-Aware Technologies in a Hospital Environment, Center for Pervasive Healthcare (2006).

(56) References Cited

OTHER PUBLICATIONS

Barrett, D., Engadget, "Jambo, Social Networking Tool at MWSF" (Dec. 31, 2005).
Barry M. Leiner et al.; Brief History of the Internet; Internet Society; Oct. 15, 2012.
Baseview.com webpages from www.archive.org, archived Jan. 16, 1997.
Battelle, John; "The Search - How Google and Its Rivals Rewrote the Rules of Business and Transformed Our Culture"; pp. 167-171; 2005.
Bayne, Kim M., AdKnowledge rolls out Web ad evaluation tool, adage.com, Jul. 8, 1999.
Beigl, Michael et al.; The Ubicompbrowser; Telecooperation Office, University of Karlsruhe; 1998.
Bellman, Steven et al.; Duane; Interactive Television Advertising: A Research Agenda; ANZMAC 2005 Conference: Advertising/Marketing Communications Issues; 2005.
Bergstein B.; "Ad-targeted System Monitors Your Interests with ISP's Help"; from website www.siliconvalley.com; Dec. 10, 2007.
BERNSTEIN, D.J.; E-mail re: Internet host SMTP server survey; http://cr.yp.to/surveys/smtpsoftware.txt; Nov. 29, 1996.
Bilchev, G. and Marston, D.; Personalised Advertising - exploiting the distributed user profile; BT Technology Journal, Vol. 21, No. 1; Jan. 2003.
Boncella, Robert; Internet Privacy - At Home and At Work; Communications of the Association for Information Systems; Volume 7, Article 14; Sep. 2001.
Bozios, Theodoros et al.; Advanced Techniques for Personalized Advertising in a Digital TV Environment: The imedia System; Intracom S.A., R&D Division, Development Programmes Department; 2001.
Braun, Elmar et al.; Accessing Web Applications With Multiple Context-Aware Devices; Department of Computer Science, Darmstadt University of Technology; 2004.
Bruner, Rick E., Interactive, NetGravity to launch new ad service bureau, adage.com, Dec. 1, 1997.
Bruner, Rick E., Small networks chase per-click ad business, Aaddzz, Valueclick compete, Advertisingage, Sep. 8, 1997.
Cagenius, Torbjörn et al.; Evolving the TV experience: Anytime, anywhere, any device; Ericsson Review No. 3; pp. 107-111; 2006.
Carter, Casey and Kravets, Robin; User Devices Cooperating to Support Resource Aggregation; Department of Computer Science, University of Illinois; 2002.
Castro et al., A Probabilistic Room Location Service for Wireless Networked Environments, Ubicomp 2001, LNCS 2201, pp. 18-34 (2001).
Chan, M.C. and Woo, T.Y.; Next-generation wireless data services: Architecture and experience; Personal Commuincations, IEEE, 6(1); 1999.
Chang et al., "Goodies" in exchange for Consumer Information on the Internet, The Economics and Issues, Proceedings of the Thirty-First Annual Hawaii International Conference on System Sciences, 1998.
Chen, Andy; "Behavioral Matchmaking, Part 3: GPS and Behavioral Targeting"; from website http://www.clickz.com; Nov. 24, 2004.
Chen, Andy; "The New Behavioral Wunder"; from webpage http://www.clickz.com; Apr. 11, 2007.
Chiu et al., Liteminutes, An Internet-Based System for Multimedia Meeting Minutes," WWW10, May 2-5, 2001.
Chorianopoulos, Kostas et al.; Metrics For Advertisement Effectiveness Measurement In The Interactive TV Environment: The imedia Case; 14th Bled Electronic Commerce Conference; Jun. 25-26, 2001.
Cleland, Kim, Accipiter latest entrant in race to manage ads; company sets sights on helping content providers target audience, Adage.com, Sep. 9, 1996.
Cleland, Kim, New Player joins fray of Web ad targeters, adage.com, Feb. 24, 1997.

Coactive TV: CoTVTM Enables Powerful Interactive TV Now; press release at http://www.teleshuttle.com/cotv/CoTVPR902.htm; Sep. 19, 2002.
Commercialization of the World Wide Web, The Role of Cookies, vanderbilt.edu web pages, archive.org, Feb. 1, 1997.
Cox et al., Intellibadge, Towards Providing Location-Aware Value-Added Services at Academic Conferences," Ubicomp 2003, LNCS 2864, pp. 264-280 (2003).
Crabtree et al., Adaptive Personal Agents, Personal Technologies (1998).
Cuzzocrea et al., Enriching Conceptual Modeling of XML-Aware Adaptive Web Systems with Object-Oriented Constructs and UML Diagrams," EC-Web 2004, LNCS 3182, pp. 248-258 (2004).
D.A.R.P.A., Internet Protocol; DARPA Internet Program Protocol Specification; Internet Engineering Task Force; available at https://tools.ietf.org/html/rfc791; Sep. 1981.
Dalton, Gregory, OPS, Answer to Cookies?, Informationweek, Oct. 13, 1997.
David W. Schumann & Ester Thorson, Advertising and the World Wide Web, Lawrence Erlbaum Associates, 1999.
De Castro, Josephine E. and Shimakawa, Hiromitsu; Mobile Advertisement System Utilizing User's Contextual Information; Proceedings of the $7^{th}$ International Conference on Mobile Data Management; 2006.
Dedrick, Rick; A Consumption Model for Targeted Electronic Advertising; IEEE Multimedia; 1995.
Dedrick, Rick; Interactive Electronic Advertising; IEEE; 1994.
Definition of "modem," H. Newton, Newton's Telecom Dictionary, CMP Books, 2000.
Doubleclick Inc., Form S-1 Registration Statement (1997).
Doubleclick.com webpages from www.archived.org, archived Feb. 5, 1998.
Drake, Eddie C.; Next-Generation Architecture for IPTV Middleware; Myrio Corporation; 2006.
Dreze, Xavier and Zufryden, Fred; Is Internet Advertising ready For Prime Time?; Apr. 5, 1998.
Dunn et al.; Privacy and Profiling on the Web; Submitted to W3C on Jun. 2, 1997.
Elderbrock & Borwankar, Building Successful Internet Businesses, IDG Worldwide, 1996.
Emert, 2 Web Ad Firms Decide to Marry, Palo Alto's Focalink, Clickover Merging, San Francisco Chronicle, Nov. 17, 1997.
Engage Technologies, Inc.; Form S-1A; filed with the SEC; pp. 36-50; Jul. 19, 1999.
EPIC - Privacy and Human Rights Report 2006; http://www.worldlii.org/int/journals/EPICPrivHR/2006/PHR2006-Behavior.html; 2006.
Equal Access Networks for real broadband access; Cisco Systems white paper; 2002.
Exhibits E-1 through E-14 (as revised) of Yahoo's Invalidity Contentions cited above; Jun. 30, 2017 and Aug. 22, 2017.
Fallahkhair, S. et al.; Development of a cross-platform ubiquitous language learning service via mobile phone and interactive television; Journal of Computer Assisted Learning, 23, pp. 312-325; 2007.
Fallahkhair, Sanaz; Dual Device User Interface Design for Ubiquitous Language Learning: Mobile Phone and Interactive Television (iTV); Proceedings of the 2005 IEEE International Workshop on Wireless and Mobile Technologies in Education; 2005.
FAQ from Zango Ad Services; http://adservices.zango.com; 2007.
Fawcett, Adrienne W., Publishers thankful but nervous about boom, Magazinedotcom, Hot spending boosts ..., adage.com, Nov. 1, 1999.
Fernández, Yolanda Blanco et al.; Avatar: An Improved Solution for Personalized TV based on Semantic Inference; Department of Telematics Engineering, University of Vigo; Jan. 11, 2006.
firefly.com web pages, archive.org, archived 1998-2000.
Fletcher et al., Practical Web Traffic Analysis: Standard, Privacy, Techniques, Results (2002); Chapters 1 and 3.
Ford, Bryan et al.; Persistent Personal Names for Globally Connected Mobile Devices; OSDI '06 Paper; pp. 233-248; Nov. 2006.

(56) References Cited

OTHER PUBLICATIONS

Front Porch WiFi Messaging and Advertising Solution; Front Porch; Feb. 24, 2006.
Gal-Or, Esther et al.; Targeted Advertising Strategies on Television; Management Science 52(5); pp. 713-725; 2006.
Gallagher & Parsons, A Framework for Targeting Banner Advertising on the Internet, Proceedings of the Thirtieth Hawaii International Conference on System Sciences, Jan. 1997.
Geier, Eric; The Business Side of Hosting a Hotspot; http://www.ciscopress.com/articles/printerfriendly/680821; Jan. 12, 2007.
Genco et al., An Augmented Campus Design for Context-aware Service Provision, SIGUCCS'05 (Nov. 6-9, 2005.
Genco, et al. An Agent-Based Service Network for Personal Mobile Devices, IEEE (2006).
Gershman, Anatole; Ubiquitous Commerce - Always On, Always Aware, Always Pro-active; The 2002 International Symposium on Applications and the Internet (SAINT 2002); Jan. 30, 2002.
Gilbert, Jennifer, CMGI's Web dealmaking hits big-time, Advertising Age, Oct. 4, 1999.
Gilbert, Special Report, Agencies centralize Web ad serving, adage.com, Mar. 1, 1999.
Gordon, Mary Ellen et al.; Consumer attitudes towards Internet; International Marketing Review, Vol. 14, Issue 5; pp. 362-375; 1997.
Graham, Ian S., HTML Sourcebook, A Complete Guide to HTML, John Wiley & Sons (1995).
Grant, Peter and Marr, Merissa; "Comcast Nears Pact With Disney To Offer ABC Shows On Demand"; The Wall Street Journal Online; Nov. 21, 2006.
Grant, Peter; "To Ward Off New Competitors, Comcast Builds a Mini Internet"; Wall Street Journal online; Oct. 13, 2005.
Hahn, The Internet Complete Reference (2d ed. 1996); chapters 10, 25, 26.
Hansen, Lars M.; Blocking spam with Sendmail; http://www.hansenonline.net/networking/sendmail-spam.html; Feb. 2003.
Harris, Amy and Ireland, Greg; Enabling IPTV: What Carriers Need to Know to Succeed; white paper from IDC Analyze the Future; May 2005.
Harte, Lawrence; 10 Things You Need to Know About IP Television; iptvmagazine.com; Jul. 2005.
Harwood, Susie; The Revolution Masterclass on cross-media planning; Revolution; London; pp. 62-64; May 2006.
Hersley et al., Implementation of OPS Over HTTP, Submitted to W3C on Jun. 2, 1997.
Hersley et al., Proposal for an Open Profiling Standard, Submitted to W3C on Jun. 2, 1997.
Hersley et al., Standard Practices of OPS Systems, Submitted to W3C on Jun. 2, 1997.
Hess et al., A Context-Aware Data Management System for Ubiquitous Computing Applications, Proceedings of the 23rd Intl. Conf. on Distributed Computing Systems (2003).
Hofer, Thomas et al.; Context-Awareness on Mobile Devices - the Hydrogen Approach; Proceedings of the 36th Hawaii International Conference on System Sciences; 2002.
Hristova, Nataliya and O'hare, G.M.P.; Ad-me: Wireless Advertising Adapted to the User Location, Device and Emotions; Proceedings of the 37th Hawaii International Conference on System Sciences; 2004.
Hunt, Timothy J., "Moving Target", Financial Post, Oct. 1, 2000.
IEEE Standard 802.11; IEEE Standard for Information technology-Telecommunications and information exchange between systems-Local and metropolitan area networks-Specific requirements; Part 11: Wireless Medium Access Control (MAC) and Physical Layer Specifications; 1999 Edition.
IEEE Standard 802.3; IEEE Standard for Information technology-Telecommunications and information exchange between systems-Local and metropolitan area networks-Specific requirements; Part 3: Carrier sense multiple access with collision detection (CSMA/CD) access method and physical layer specifications; 2002 Edition.
Interactive PR, Vol. 2, No. 16, interview with Kevin O'Connor, "The Burger King of Internet Advertising" (Aug. 12, 1996).
Ito, Masaki et al.; Smart Furniture: Improvising Ubiquitous Hotspot Environment; Graduate School of Media and Governance, Keio University; May 19, 2003.
Iwasaki et al., Azim, Direction Based Service using Azimuth Based Position Estimation, ICDCS (2004).
Jensen, Jens F.; Interactive Television: New Genres, New Format, New Content; Proceedings of the Second Australasian Conference on Interactive Entertainment; pp. 89-96; Nov. 23, 2005.
Johnson, Bradley; Interactive: Planet Oasis Gives Web Sites Promotion Clout; Advertising Age; available at http://adage.com/article/news/interactive-planet-oasis-web-sites-promotion-clout/78467; Jul. 8, 1996.
Jones, Duncan; The History of Pay Per Click (PPC) Marketing; available at https://www.duncanjonesnz.com/history-of-ppc-marketing; Sep. 23, 2014.
Juels, Ari; Targeted Advertising... And Privacy Too; RSA Laboratories; 2001.
junkbusters.com web pages; archive.org; archived Apr. 1997 through Nov. 2000.
Karpinski, Richard; ICE application to revolutionize e-commerce; Business Marketing, Mar. 1998.
Kaye, Kate; "Tivo Broadens CBS Offerings, Adds Web-to-TV Services"; from www.clickz.com; Nov. 15, 2006.
Keegan, Paul; "The Man Who Can Save Advertising"; from http://money.cnn.com; Nov. 1, 2004.
Kim, Jong Woo and Du, Stephen; Design for an Interactive Television Advertising System; Proceedings of the 39th Hawaii International Conference on System Sciences; 2006.
Kim, Munjo et al.; Target Advertisement Service Using TV Viewers' Profile Inference; ; PCM 2005, Part T, LNCS 3767, pp. 202-211; 2005.
Koutsorodi, Artemis et al.; A Management Architecture For Enabling Wireless System Operation In The B3g Context And Exploitation Of The Abc Concept; National Technical University of Athens, School of Electrical and Computer Engineering; 2001.
Kravets; Robin et al.; A Cooperative Approach to User Mobility; Department of Computer Science, University of Illinois; Oct. 2001.
Kristol, D. & Montulli, L.; HTTP State Management Mechanism; Internet Engineering Task Force; available at https://tools.ietf.org/html/rfc2109; Feb. 1997.
Langheinrich et al., Unintrusive Customization Techniques for Web Advertising, Computer Networks 31, 1259-1272, May 1999.
Lee, Choonhwa et al.; Konark: A system and protocols for device independent, peer-to-peer discovery and delivery of mobile services; IEEE Xplore Document; Nov. 2003.
Lee, Jeongkeun et al.; Hybrid gateway advertisement scheme for connecting mobile ad hoc networks to the Internet; 2003.
Lekakos, George et al.; Information Systems In The Living Room: A Case Study Of Personalized Interactive TV Design; Global Co-Operation in the New Millenium; The 9th European Conference on Information Systems; Bled, Slovenia, Jun. 27-29, 2001.
Lekakos, Georgios and Giaglis, George M.; Delivering Personalized Advertisements in Digital Television: A Methodology and Empirical Evaluation; Jan. 2002.
Lekakos, Georgios et al.; An Integrated Approach to Interactive and Personalized TV Advertising; eL TRUN- The eBusiness Center, Department of Management Science & Technology, Athens University of Economics and Business; 2001.
Lo, Shih-Hsiang et al.; Controlling Digital TV Set-Top Box with Mobile Devices via an IP Network; National Taiwan University; pp. 935-942; May 20, 2006.
Lyu, Jihye et al.; Design of Open APIs for Personalized IPTV Service; ICACT 2007; Feb. 12-14, 2007.
Maekawa et al., A Java-Based Information Browsing System in a Remote Display Environment, IEEE (2004).
Mahler, Alwin and Steinfield, Charles; The Evolving Hot Spot Market for Broadband Access; Oct. 2003.
matchlogic.com web pages, archive.org, Apr. 13, 2000.
Mate; Sujeet et al.; Movable-Multimedia: Session Mobility in Ubiquitous Computing Ecosystem; MUM '06; Dec. 4-6, 2006.

(56) References Cited

OTHER PUBLICATIONS

Mccandless, Michael; Web Advertising; IEEE Intelligent Systems; May/Jun. 1998.
McCarthy et al., UniCast, OutCast & GroupCast, Three Steps Toward Ubiquitous, Peripheral Displays, Ubicomp 2001, LNCS 2201, pp. 332-345 (2001).
Meeker, Mary, The Internet Advertising Report, Harper Business, 1997.
Merisavo, Marko and Vesanen, Jari; The effectiveness of targeted mobile advertising in selling mobile services: an empirical study; Int. J. Mobile Communications, Vol. 4, No. 2, pp. 119-127; 2006.
Microsoft Computer Dictionary (5th ed. 2002); pp. vii-viii, 444.
Mishra, Pinki; Coming to a TV Set Near You; Catalog Age, 18, 8; Proquest Central, pg. 61; Jul. 2001.
Moon, Aekyung et al.; Context-Aware Active Services in Ubiquitous Computing Environments; ETRI Journal, Volume 29, Number 2; Apr. 2007.
Nakajima et al., Universal Interaction with Networked Home Appliances, ICDCS'02, IEEE (2002).
Nakazawa et al., A Bridging Framework for Universal Interoperability in Pervasive Systems, ICDCS'06 IEEE (2006).
Nawyn et al., Embedding Behavior Modification Strategies into a Consumer Electronic Device, A Case Study, Ubicomp 2006, LNCS 4206, pp. 297-314 (2006).
Needleman, R., CNET.com, "Jambo brings your online social network into the real world" (May 24, 2006).
net.Genesis & Devra Hall, Build a Website, The Programmer's Guide to Creating, Building, and Maintaining a Web Presence, Prima Publishing (1995).
NetGravity Launches AdServer 3.5 with Beefed Up Targeting, clickz.com, Sep. 10, 1998.
New York Times, "An Advertising Power, but Just What Does Doubleclick Do?" (Sep. 22, 1999).
Newcomb, Kevin; "BMW Uses TiVo Technology to Improve Product Placement"; from www.clickz.com; Jun. 21, 2006.
Ng, Vincent and Ho, Mok Kwan; An Intelligent Agent For Web Advertisements; International Journal of Foundations of Computer Science; Vol. 13, No. 4; pp. 531-554; 2002.
Ngai, E.W.T.; Selection of web sites for online advertising using the AHP; Information & Management 40; pp. 233-242; 2001.
Novak & Hoffman, New Metrics for New Media, Toward the Development of Web Measurement Standards, Project 2000, elab.vanderbilt.edu, Sep. 26, 1996.
O'Connor, The Map of Innovation, Creating Something Out of Nothing (pp. 181-217) (2003).
Oharrow, Robert, Washington Post, "Officials Fear Plague of 'Web Bugs'" (Nov. 13, 1999).
OpenTV® IPTV Solutions; white paper; OpenTV, Inc.; Sep. 2005.
P. Srisuresh et al., Request for Comments (RFC) 2663, IP Network Translator (NAT) Terminology and Considerations, Aug. 1999.
Palmer & Eriksen, Digital Newspapers Explore Marketing on the Internet, Communications of the ACM, Vol. 42, No. 9, Sep. 1999.
Pham, Thai-Lai et al; A Situated Computing Framework for Mobile and Ubiquitous Multimedia Access using Small Screen and Composite Devices; Jan. 2000.
Phelps, Joseph E. et al.; Viral Marketing or Electronic Word-of-Mouth Advertising: Examining Consumer Responses and Motivations to Pass Along Email; Journal of Advertising Research; Vol. 44, No. 4; Dec. 2004.
Podnar, Ivana et al.; Mobile Push: Delivering Content to Mobile Users; Jul. 2, 2002.
Poikselktä, Miikka, et al.; "IMS Concepts"; The IMS: IP 1-15 Multimedia Concepts and Services, Second Edition; John Wiley & Sons, Ltd.; 2006; pp. 43-116.
Ponnekanti et al., Icrafter, A Service Framework for Ubiquitous Computing Environments," Ubicomp 2001, LNCS 2201, pp. 56-75 (2001).
Pramataris, K. et al.; Personalized Interactive TV Advertising: The imedia Business Model; Electronic Markets; Vol. 11 (1): 1-9; 2001.
Prasad, Ashutosh et al.; Advertising versus pay-per-view in electronic media; International Journal of Research in Marketing 20, 13-30; 2003.
Prata, Alcina et al.; iTV Enhanced System for Generating Multi-Device Personalized Online Learning Environments; 2004.
Raskutti and Beitz, Acquiring Customer Preferences for Information Filtering, a Heuristic-Statistical Approach, Fifth Annual Conference on User Modeling (1996).
Ratsimor, Olga et al.; encentive: A Framework for Intelligent Marketing in Mobile Peer-To-Peer Environments; Department of Computer Science and Electrical Engineering, University of Maryland; 2003.
Reisman, Richard R.; Coactive Television Interactive TV, the Web, and 'Co-vergence': A User and Content-Centric Re-visioning; white paper at: http://www.teleshuttle.com/cotv/CoTVWP2.htm; Sep. 2002.
Rekimoto; Jun et al.; Proximal Interactions: A Direct Manipulation Technique for Wireless Networking; Interaction Laboratory, Sony Computer Sciences Laboratories, Inc.; 2003.
Request for Comments (RFC) 793, Transmission Control Protocol, DARPA Internet Program Protocol Specification, Sep. 1981.
RFC 1531, "Dynamic Host Configuration Protocol," Oct. 1993; pp. 1-39.
RFC 950, "Internet Standard Subnetting Procedure," Aug. 1985; pp. 1-18.
Ribeiro-Neto et al., Extracting Semi-Structured Data Through Examples, Proceedings of the Eighth international Conference on Information and Knowledge Management (1999).
Ribeiro-Neto, Berthier et al.; Impedance Coupling in Content-targeted Advertising; SIGIR '05; Aug. 15-19, 2005.
Risden, Kirsten et al; Interactive Advertising: Patterns of Use and Effectiveness; CHI '98, 18-23; pp. 219-224; Apr. 1998.
Robbin Zeff & Brad Aronson, Advertising on the Internet (2d ed. 1999) ("Zeff"); chapters 1, 2, 4, 6, 7, 9, and 10.
Robertson, Scott et al.; Dual Device User Interface Design: PDAs and Interactive Television; Applied Research, US West Advanced Technologies; 1996.
Roscheisen, R. Martin; A Network-Centric Design for Relationship-Based Rights Management (Dissertation); Dec. 1997.
Ruta et al., Ontology driven resource discovery in a Bluetooth based m-marketplace, CEC/EEE'06, IEEE (2006).
S-1/A SEC Filing, filed by FlyCast Communications Corp. on Apr. 30, 1999.
Samar, Vipin; Single Sign-on Using Cookies for Web Applications; IEEE 8th International Workshops on Enabling Technologies: Infrastucture for Collaborative Enterprises (WET ICE '99); Jun. 16-18, 1999.
Schulzrinne, Henning et al.; Ubiquitous Computing in Home Networks; IEEE Communications Magazine; Nov. 2003.
Shen, Andrew; Online Profiling Project - Comment, P994809; Nov. 8, 1999.
Shukla, Anuradha; "Visible World Offers 'Any Screen' Solution for Customized Video Advertising"; from www.tmcnet.com; Feb. 6, 2007.
Siew, David and Yi, Xun; Agent-mediated Internet Advertising; IEEE; 2000.
Singh & Dalal, Web Home Pages as Advertisements, Communications of the ACM, Aug. 1999.
Smetters et al., Instant Matchmaking, Simple and Secure Integrated Ubiquitous Computing Environments, Ubicomp 2006, LNCS 4206, pp. 477-794 (2006).
Smyth, Barry and Cotter, Paul; A Personalized Television Listings Service; Communications of the ACM; Vol. 43, No. 8, pp. 107-111; Aug. 2000.
Sogo et al., Lightholder, A Platform for Real-World Mobile Commerce, CEC/EEE'06, IEEE (2006).
Spangler, William E. et al.; Exploring The Privacy Implications Of Addressable Advertising And Viewer Profiling; Communications of the ACM, Vol. 49, No. 5; May 2006.
Spangler, William E. et al.; Using Data Mining To Profile Tv Viewers; Communications of the ACH; Vol. 46, No. 12; pp. 67-72; Dec. 2003.

(56) References Cited

OTHER PUBLICATIONS

Story, Louise; "The Web drives an advertising boom without the need for agencies"; International Herald Tribune (iht.com); Feb. 8, 2007.
Sumi et al., Digital Assistant for Supporting Conference Participants, An Attempt to Combine Mobile, Ubiquitous and Web Computing, Ubicomp 2001, LNCS 2201, pp. 156-175 (2001).
Tam, Pui-Wing; "TiVo, Amazon to Deliver Web Video to TV Sets"; The Wall Stree Journal Online; Feb. 7, 2007.
Taskiran, Cuneyt et al.; Seamless Content Consumption Across Media Delivery Channels and Devices Using Media Bundles; SCTE Conference on Emerging Technologies; Jan. 23-25, 2007.
Tedeschi, B., New York Times On the Web, "Doubleclick's Competitors Relieved, for Now" (Mar. 6, 2000).
Thawani, Amit et al.; Context Aware Personalized Ad Insertion in an Interactive TV Environment; Applied Research Group, Satyam Computer Services Ltd.; Jan. 2004.
Thawani, Amit et al.; Viewing Characteristics based Personalized Ad Streaming in an Interactive TV Environment; Applied Research Group, Satyam Computer Services, Ltd.; 2004.
The Clickz Network, Netscape Selects Real Media's Open Adstream, Jan. 13, 1998.
The Clickz Network, Real Media Signs More Media Companies, Dec. 30, 1998.
The Gresham Hotel, http://ambassadordublin.com/the-gresham-hotel; Feb. 24, 2007.
Time Warner Cable, Using BIAP Systems' Interactive Technology, Expands Availability of 'Fantasy Football Tracker'; http://www.timewarner.com/newsroom/press-releases/2006/09/19/time-warner-cable-using-biap-systems-interactive-technology; Sep. 19, 2006.
Tittel et al., Foundations of World Wide Web Programming with HTML & CGI, IDG Books Worldwide (1995).
Tomlin, John A.; An Entropy Approach To Unintrusive Targeted Advertising On The Web; IBM Research Divison; Jun. 2000.
Trevor et al., Issues in Personalizing Shared Ubiquitous Devices, UbiComp 2002, LNCS 2498, pp. 56-72 (2002).
Tungate, Mark; Adland: A Global History of Advertising, 2d Ed. (2013).
Vanem, Erik et al.; Managing Heterogeneous Services And Devices With The Device Unifying Service; Telenor R&D; Mar. 24, 2003.
Wagner, Ben; Driving IPTV Growth: The Challenges and Perspectives; Texas Instruments; Sep. 2005.
Wang, Helen J. and Katz, Randy H.; Mobility Support in Unified Communication Networks; Computer Science Department, University of California, Berkeley; Jan. 31, 2001.
White B.; "Watching What You See on the Web"; Wall Street Journal Online; Dec. 6, 2007.
Williamson, Debra Aho, Targeting distinguishes AdForce from the pack, adage.com, Mar. 1, 1999.
Williamson, Debra Aho, Web ads mark 2nd birthday with decisive issues ahead, adage.com, Oct. 21, 1996.
Wingfield, Nick; "New Tivo Feature Lets Families Share Videos On TV Via the Web"; The Wall Street Journal Online; Nov. 14, 2006.
www.Spinbox.com webpages, www.archive.org, archived beginning Nov. 11, 1998.
Yahoo's Invalidity Contentions (pages related to parent patents in this family); Almondnet, Inc. et al. v. Yahoo! Inc., Civil Action No. 16-cv-1557-ILG-SMG, U.S. District Court for the Eastern District of New York; Jun. 30, 2017.
Yang, Herong; 'SendMail' Mail Transfer Agent Developed by Eric Allman, http://www.herongyang.com/Computer-History/Sendmail-Mail-Transfer-Agent-by-Eric-Allman-1983.html; 1983.
Yang, Wan-Shiou et al.; Mining Social Networks for Targeted Advertising; Proceedings of the 39th Hawaii International Conference on System Sciences; Feb. 24, 2006.
Yeager & McGrath, Web Server Technology, The Advance Guide for World Wide Web Information Providers, Morgan Kaufmann Publishers (1996).
Yoon, Jeong Hyun et al.; TV-Anytime based personalized bi-directional metadata service system; 2006.
Youiji Kohda & Susumu Endo, Ubiquitous Advertising on the WWW, Merging Advertisement on the Browser, Fifth International World Wide Web Conference (May 1996).
Yu, Zhiwen et al.; User Preference Learning for Multimedia Personalization in Pervasive Computing Environment; KES 2005, LNAI 3682; pp. 236-242; 2005.
Yuan, Soe-Tsyr and Tsao, Y.W.; A recommendation mechanism for contextualized mobile advertising; Expert Systems with Applications 24, pp. 399-414; 2003.
Zeff & Aronson, Advertising on the Internet, 1st Edition, John Wiley & Sons (1997).
Zeff & Aronson, Advertising on the Internet, 2nd Edition, John Wiley & Sons (1999).
Zhang et al., Smart Alarm Clock - A Networked Home Appliance with Bluetooth Connection, IEEE (2004).
Zwicky, Building Internet Firewalls (2d ed. 2000): table of contents, ch. 5.
Golden, G. Richard III; Service Advertisement and Discovery: Enabling Universal Device Cooperation; IEEE Internet Computing; Sep. - Oct. 2000.
Luening E.; "Free ISP NetZero beefs up ad services"; web page at http://www.news.com/Free-ISP-NetZero-beefs-up-ad-services/2100-1023_3-241067.html; Jan. 2, 2002.
Todd, Daniel; "The New World of Desktop Advertising"; DMNews.com; Mar. 28, 2007.
Hashman, Steve and Knudsen, Steven; The Application of Jini™ Technology to Enhance the Delivery of Mobile Services; PsiNaptic; Dec. 2001.
Coactive TV, A new way to enable and profit from Interactive TV now; archived at https://web.archive.org/web/20020920101402/http://www.teleshuttle.com/cotv/default.htm; Sep. 20, 2002.
Mcgill, A., D Magazine, "A New Way to Network" (Aug. 1, 2006).
"Nissan, BellSouth, Music Blvd. Among Latest Advertisers to Sign Up With NetZero"; press release from www.irconnect.com; Nov. 16, 1998.
"NetZero Guarantees Increase in Web Site Traffic for New Advertisers"; press release from www.irconnect.com; circa 2000.
Saunders, Christopher; "NetZero to Launch Mobile Ad Platform"; from website www.clickz.com; Mar. 29, 2001.
Olsen, S.; "TiVo is in talks with Internet search giants Google and Yahoo over possible deal ... television and the Web..."; www.news.com; Apr. 18, 2005.
Baseview.com website (ClassManagerPro) from www.archive.org, archived Jan. 16, 1997.
RealMedia.com webpages, www.archive.org, archived on May 15, 1997 and Jun. 7, 1997.

* cited by examiner

US 11,805,300 B2

SYSTEM FOR TAKING ACTION USING CROSS-DEVICE PROFILE INFORMATION

This application is a continuation of application Serial No. 17/877,870, filed Jul. 29, 2022, now U.S. Pat. 11,589,136, which is a continuation of application Serial No. 17/714,965, filed Apr. 6, 2022, now U.S. Pat. 11,564,015, which is a continuation of application Serial No. 16/925,655, filed Jul. 10, 2020, now U.S. Pat. 11,303,973, which is a continuation of application Serial No. 16/228,479, filed Dec. 20, 2018, now U.S. Pat. 10,715,878, which is a continuation of application Serial No. 15/803,631, filed Nov. 3, 2017, now U.S. Pat. 10,178,442, which is a continuation of application Serial No. 15/179,356, filed Jun. 10, 2016, now U.S. Pat. 9,813,778, which is a continuation of application Serial No. 14/246,525, filed Apr. 7, 2014, now U.S. Pat. 9,369,779, which is a division of application Serial No. 13/097,885, filed Apr. 29, 2011, now U.S. Pat. 8,695,032, which is a division of application Serial No. 12/860,666, filed Aug. 20, 2010, now U.S. Pat. 8,281,336, which is a continuation of application Serial No. 11/736,544, filed Apr. 17, 2007, now U.S. Pat. 7,861,260.

BACKGROUND

The field of the present invention relates to online access and targeted delivery of advertisements. In particular, television advertisements are targeted based on observed online (i.e., Internet) behavior of a television viewer without employing personally identifiable information.

Some of the terms used in the present disclosure or appended claims are defined as follows.

Television provider (TVP) - an entity that provides television service to a subscriber or user via any suitable transmission medium, including but not limited to coaxial cable, fiber-optical cable, network cable, phone line, satellite transmission, or VHF or UHF transmission.

Internet service provider (ISP; equivalently, an online access provider) - an entity that provides online access to a subscriber or user via any suitable transmission medium, including but not limited to coaxial cable, fiber-optical cable, network cable, phone line, satellite transmission, wireless transmission (e.g., WiMax, WiFi, other IEEE 802 wireless protocols, etc.), or VHF or UHF transmission. The online access enables the subscriber to access the Internet and its myriad online sites, or to access any future network successor to the Internet.

Set-top box (STB) - a device that connects a television and a signal source. The STB receives an incoming signal, extracts content from the received signal, and transmits the extracted content to the television to be presented to a viewer. The signal source can be a computer network cable (e.g., an Ethernet or other transmission-speed cable), a satellite dish, a coaxial cable connected to a cable television system, a telephone line or digital subscriber line (DSL), a wireless network connection, an antenna (VHF, UHF, digital, or other), or another suitable signal source. The content can include, but is not limited to, video (which often can include an audio portion), audio, Internet web pages, interactive games, or other content. An STB may or may not include a dedicated television tuner. Despite its name, an STB need not be physically located on top of a television set literally. Under current technology, STBs often are located physically adjacent to the television set, such as in a media cabinet or the like, but it is not even necessary that the STB be located in proximity to the television. Nor is it necessary that the STB be a box, literally. Rather, a STB might be implemented, for example, as a circuit board, integrated circuit, set of integrated circuits, or software that is physically integrated with another "box," such as the television, a cable or other connection, a computer, or a building equipment or junction box, which also has other functions, or without being housed in any "box" at all.

Digital video recorder (DVR, alternatively personal video recorder or PVR) - a device that stores video content in a digitally encoded format on a digital storage medium, such as a hard drive, and enables playback of the stored content. A DVR can comprise a stand-alone unit connected to a television, an STB, or a signal source, or the DVR can comprise software that programs a computer to perform DVR storage and playback functions.

Video-on-Demand (VOD) - a system that allows users to select and view video content delivered from a signal source in response to a request from the user. Typically, the requested video content can be viewed at a time of the user's own choosing and can be paused, rewound, or fast-forwarded as desired by the user. A VOD system can "stream" the content (enabling viewing of portions of a requested item of video content while other portions are still being delivered from the signal source), or the VOD system can "download" the content and allow viewing only after a complete item is delivered from the signal source. Some VOD systems allow users to select and watch video content over a network as part of an interactive television system.

Interactive Television (interactive TV, iTV, idTV, or ITV) - any television system that enables a viewer to interact with video content delivered to a television. Interactive television can include, but is not limited to, access to Web sites through TV "crossover links," electronic mail and online chat, online commerce, or enhanced graphics (relative to standard television offerings).

Internet Protocol Television (IPTV) - a system wherein television content is delivered via a computer network using Internet Protocol (IP). For residential users, IPTV is often provided in conjunction with Video on Demand and can also be bundled with Internet services such as Internet access and Voice-over-IP (VoIP). Commercial bundling of IPTV, VoIP, and Internet access is sometimes referred to in the industry as a "triple play." Additional telecommunications services (e.g., mobile voice or data service) can be added, yielding a "quadruple play" and so forth. IPTV typically is supplied by a broadband service provider using a closed network infrastructure. IPTV also can be provided over the Internet or other publicly accessible computer network, in which case it might be referred to as Internet TV or TV-over-Internet. IPTV also can be used to deliver video or other content over a corporate LAN or other business network.

Online user interface device - any user interface device used to access a remote network such as the Internet, including but not limited to a cell phone or mobile handset, a personal digital assistant (PDA), or a networked computer (desktop, workstation, notebook, laptop, or other).

Online access device - any device used to connect an online user interface device to a remote network such as the Internet, including but not limited to a modem, a wired or wireless router, a wireless access point, a wired network adapter (e.g., Ethernet adapter), a wireless network adapter (e.g., IEEE 802.11, ED-VO, EDGE, HSPA, CDMA, GSM, or other), or an optical fiber based network adapter (e.g., a network interface unit or optical network terminal). Different types of online access devices can and sometimes are combined into a single unit (e.g., a modem that also functions as a router for a LAN). An online user interface device and an online access device can be, and sometimes are, combined into a single unit (e.g., a computer with a built-in Ethernet adapter, wireless adapter, or modem).

Router - any device that acts as a junction between networks, to buffer and transfer data between or among them. For example, a router can be employed to connect a local area network (LAN) to the Internet, thereby enabling online user interface devices connected to the LAN to share a connection to the Internet through the router. The router receives data from devices on the LAN and transmits them to the Internet directed to their corresponding destinations, and receives data from the Internet and directs them to the corresponding devices on the LAN.

Modem - a device that enables online access by a user by acting as an interface between the online access provider's network transmission system and the user's computer or other online user interface device. Modems vary according to the type of provider network transmission system. Unless a specific type of modem is specified, the term "modem" shall encompass telephone modems, cable modems, DSL modems, wireless modems, satellite modems, or modems for providing online access to any other suitable network transmission system.

Cable modem - a type of modem that enables digital data transmission over cable television infrastructure. Cable modems are primarily used to deliver broadband Internet access using modulation frequencies that are not used for traditional television transmission.

Asymmetric Digital Subscriber Line (ADSL, or often DSL) - a data communications technology that enables faster data transmission over a copper telephone line than a conventional modem can provide. ADSL data transmission employs frequencies that typically are not used for voice transmission, usually frequencies beyond the range of normal human hearing (higher than about 20 kHz). Propagation of such high-frequency signals over standard copper telephone lines typically is poor, typically limiting the use of DSL to distances less than about 5 km. Once the signal reaches the telephone company's nearest central office (CO), the ADSL signal is stripped off and routed into a conventional data network, while any voice-frequency signal is routed into the conventional telephone network. That arrangement enables a single telephone line to be used for both data transmission and telephone calls simultaneously.

DSL modem - an ADSL transceiver, also known as an ADSL modem, used to connect one or more computers to a phone line to use an ADSL service. A DSL modem also can be referred to as a remote ADSL termination unit (ATU-R). An ADSL modem can also be configured to act as a router, managing the connection and sharing of the ADSL service with multiple computer or other networked devices. Such a combined device can be referred to as a DSL modem/router or similar terminology.

Digital Subscriber Line Access Multiplexer (DSLAM) - a device enabling high-speed connections between telephone lines and a computer network such as the Internet. Typically it is located at a telephone company central office (CO) and connects multiple Digital Subscriber Lines (DSLs) to a computer network, typically the Internet, using a suitable multiplexing technique.

Cable Modem Termination System (CMTS) - equipment typically found in a cable company's headend that is used to provide data communication over the cable television infrastructure, thereby enabling the cable company to offer services such as broadband Internet access or VoIP to its subscribers. To provide high-speed data services (i.e., broadband access), a cable company typically connects its headend to the Internet using high capacity data links, directly or through a network service provider. On the subscriber side of the headend, the CMTS enables data communication with each subscriber's cable modem. Various CMTSs are capable of serving different cable modem population sizes, which can range from 4,000 cable modems to 150,000 or more. A given cable company headend may have only a few CMTSs, or a dozen or more, depending on the size of the cable modem population serviced by that headend.

Dynamic Host Configuration Protocol (DHCP) - a system that automatically assigns Internet Protocol addresses (IP addresses), subnet masks, default routers, and other IP parameters, which are required for proper routing of data transmissions to or from a particular device connected to the network. The assignment usually occurs when a DHCP-configured computer, modem, router, or other device boots up or regains connectivity to the network. The DHCP client (i.e., DHCP software resident in the computer) sends out a query requesting a response from a DHCP server on the network. The query is typically initiated immediately after booting up and before the client initiates any IP-based communication with other hosts. The DHCP server then replies to the client with its assigned IP address, subnet mask, domain name server (DNS), and default gateway information (referred to as "stateful" assignment). The assignment of the IP address usually expires after a predetermined period of time, at which point the DHCP client and server renegotiate a new IP address from the DHCP server's predefined pool of IP addresses. Because, under DHCP, the IP address of a given computer varies over time, various network-related functions are more difficult. For example, configuring firewall rules to allow access to or from a machine that receives its IP address via DHCP is more complicated because the IP address varies from time to time. Network administrators typically must enable access to an entire remote DHCP subnet for a particular TCP/UDP port. Such complications arise in other instances as well. Many residential routers and firewalls are configured in the factory to act as DHCP servers for home networks. A computer can also be used as a DHCP server. Internet Service Providers (ISPs) generally use DHCP to assign individual IP addresses to subscribers. DHCPv6, which is the Dynamic Host Configuration Protocol for Internet Protocol Version 6 (IPv6), enables local generation of IP addresses (i.e., "stateless" assignment). Although such stateless address autoconfiguration of IPv6 substantially eliminates a prime motivation for DHCP in IPv4, DHCPv6 can still be used to statefully assign addresses if needed or desired by a network administrator. DHCPv6 can also be used to distribute information that is not otherwise discoverable, e.g., the domain name server.

Behavioral targeting - the delivery of specific advertisements to a subscriber, the advertisements being selected on the basis of activity of the subscriber, typically recent activity, including but not limited to: online searches conducted by the subscriber; content accessed by the subscriber online or on television; online advertisements viewed, clicked on, or otherwise accessed by the subscriber; online shopping or purchases made by the subscriber; and any other form of previous subscriber activity.

Central Ad Server (CAS) - a computer server that manages delivery of online advertisements to visitors of online sites. A local ad server can be typically run by a single online publisher to serve ads to visitors of websites of that publisher's Internet domains, or by a single advertiser to serve ads into ad space acquired by the advertiser on various other websites. A third-party or remote ad server typically is remotely located and delivers advertisements of various advertisers to visitors of websites of multiple domains owned by multiple publishers. The remote ad server acts as a central conduit for delivering advertisements, enabling advertisers and publishers to track the distribution of their online advertisements and to control the rotation and distribution of their advertisements across the Internet from one location. The advertisements can be stored on the CAS for later delivery, can be transmitted to the CAS and then delivered from the CAS upon receiving an ad request, or can be delivered from another source in response to an ad request received and routed by the CAS. Examples of third-party ad servers include DoubleClick's DART for Publishers central ad server (also known as DFP) and DoubleClick's DART for Advertisers central ad server (also known as DFA).

Profile provider - An entity that collects profile information that is used to target advertisements. In the context here, the profile provider cooperates with a CAS, which receives all or part of the collected profile information from the profile provider for use in targeting TV advertisements. User profile information derived from online activity can include observed online behavior of a user accessing the Internet or demographic information collected from a user accessing the Internet. Examples of profile providers can include, but are not limited to, any entity that owns or uses: (1) a visited Internet site server; (2) a server delivering content, images, audio, video, text, or any combination directed to an online user interface device (such as a computer or other online interface device) via an online access device (such as a modem or router), either directly or indirectly (e.g., via a redirect); (3) a server delivering an ad to an online user interface device via an online access device on behalf of an advertiser or an ad network; (4) a server recording an activity conducted from an online user interface device such as a click on an ad or a link to an ad, a viewing of an ad, a click on a link to particular content, a search, a request for product information, receipt of particular content, a product purchase, a telephone call made, or any other selected and definable user activity; or (5) a server facilitating instant messages or any other kind of communication on behalf of the user. Another example of a profile provider is: (6) a company sponsoring and having access to a computer program located on the user's computer or other online user interface device that can observe the user's online activity (with the user's permission), such as a browser toolbar or desktop search software. A profile provider, broadly, can be: (7) any entity able to collect behavioral profiles (observed online activity) or demographic profiles (provided by the user), preferably for purposes here including the IP address used when the profile was observed or collected and the date and time the profile was observed or collected, regardless of whether or not the entity collected a given profile directly through contact with the user's computer or indirectly from another entity such as those listed in this paragraph. In some cases, a user's online activity will result in direct contact between the online user interface device via an online access device and the profile provider, e.g., if the profile provider is an online commerce site, the user makes a purchase at the site, and the online commerce site generates a profile for that user. In other instances there may be no direct contact between the profile provider and the user, e.g., if the user makes a purchase at an online commerce site that in turn reports information pertaining to the user to the profile provider. In some situations, also, a profile provider might also own or otherwise control a CAS, in which case user profiles can be immediately available to the CAS without need for transmission between separate entities.

Profiles or partial profiles provided by a profile provider to a CAS can contain any quantity of profile information, such as, in one example, just an online access IP address used by a person at the time his profile was collected and the identity of the profile provider. The IP address can be provided by the profile provider itself or might be obtained by the CAS when a user engages in any online activity or provides an item of demographic information and is redirected by a profile provider to the CAS. In another example, a profile can be more extensive and can include demographic or behavioral information, such as an extensive browsing history, shipping or purchase histories, content viewed, and other information concerning the user's characteristics or the user's activities. Although the profile provider is an entity, many or most of the actions attributed to the profile provider are actually performed by equipment under the administrative control of the profile provider, such as computers, servers, software running on those computers or servers, network connection hardware or software, or other equipment. Such actions may still be characterized as being performed "by the profile provider," whether performed automatically, semi-automatically, or manually.

Personally Identifiable Information (PII) - information that can be used to identify a specific person, including but not limited to: name, Social Security number (SSN), date of birth, street address, email address, static IP address (if any), phone number (home, work, wireless), financial account numbers (bank accounts, credit accounts, or any other financial data), driver's license number, vehicle registration number, vehicle license number, facial photographs, fingerprints, handwriting or signature, or any other information that can assist in identifying a specific person.

Non-Personally-Identifiable Information (non-PII) - information about a person that typically cannot be used to specifically identify that person, including but not limited to: city, state, or country of residence, age, gender, race, ethnicity, school or workplace (if sufficiently large), salary or income, hobbies, dynamically assigned IP addresses, online sites visited, online searches conducted, or other information that is useful to know about a person but done not by itself allow one knowing the information to identify the particular person.

Cookie - a text file placed on a user's computer by a server that also serves content to the user's computer using browser software. The cookie typically can be read or altered only by a server operating under the same Internet domain as the server that originally placed the cookie. The cookie file can be used to identify a computer that has already been in contact with the same domain and can also be used to store PII or non-PII pertaining to a user of that computer. In a first example, a cookie can store non-PII such as previous searches conducted at the site, or pages viewed or visited at the site, by the computer user. In a second example, a cookie can be used to store a username used by the user to access a site, customized preferences of the user, or various pieces of PII. It should be noted that a cookie file can also be created, altered, or deleted by software located on the user's computer.

Television advertisement (TV ad) - a full screen video ad, a partial screen video ad, a banner ad, a text ad, an audio ad, or any other form of advertisement suitable for delivery to and visual or audible presentation by a television set.

Various systems are used currently for targeting advertisements based on user/viewer/customer behavior. Many of these rely on the collection of personally identifiable information (PII) to enable correlation of the person exhibiting the behavior and advertisements targeted at that person. There are some examples wherein advertisements can be targeted without collecting PII, but in such examples it is typically the case that the medium of the behavior and that of the advertisement are the same. For example, many grocery stores hand out so-called "club cards" that need not be linked to PII. A shopper presents the card at checkout to receive various discounts, thereby allowing the store to link the list of purchased items to the card. As the system "learns" the shopper's purchasing habits, the system begins issuing coupons targeted at purchases that the shopper has made previously or that the system predicts the shopper may wish to make based on past purchases. In another example, online advertisements are readily targeted based on an Internet user's online activities without using PII. The use of cookies enables an ad server to recognize an Internet site visitor who has been previously presented with ads by the ad server or who has conducted searches or accessed content at sites linked to the ad server. The ad server can target future advertising to the site visitor based on that previous activity. A user who has searched for airline tickets to southern California on an online travel site, for instance, can later receive targeted online advertisements for Disneyland, delivered perhaps while visiting some other online site, to the user's computer from an ad server that collected the user's search information from the online travel site.

It becomes more difficult to avoid the use of PII when it is desired to target advertising in one medium based on activity in another. Various schemes currently are implemented, under development, or being considered wherein PII is used, e.g., to target television advertisements based on a viewer's online behavior. Some of those schemes involve agreements or alliances among television providers, online access providers, online search portals, or online sites. The PII has typically been required to make the connection between the different media, because different devices are typically employed to access each one.

A significant shortcoming of many such cross-media ad-targeting systems is the need to use PII to target advertisements delivered in one medium based on user behavior in another medium. Battelle (John Battelle, *The Search*, Portfolio, New York, 2005) describes the delivery of personalized ads to a DVR based on observed online behavior of the DVR user (conducted searches, sites visited, etc., including PII) when he or she was using a personal computer for online access and further describes financially rewarding the user for watching the ad (e.g., by reducing the fee for the TV service or by offering "free" TV service). However, many consumers object to the merging or correlation of personally identifiable information and online behavior. Financial incentives such as free or reduced-fee games, screen-savers, content, or Internet access in return for information useful for targeting ads requiring collection and use of PII and data pertaining to online behavior generally have not proven to be attractive to the public in the past. Such combining of PII with online behavior data has proven particularly unattractive to consumers having larger incomes, who advertisers are especially interested in reaching.

An example of a cross-media ad-targeting system, planned to be implemented as a result of an announced alliance between Google and BSkyB, is a system wherein BSkyB can use searches conducted by their subscribers on the BSkyB Internet search portal to deliver targeted ads to the DVR's of those same subscribers. BSkyB already has PII pertaining to its television subscribers, so linking search results from its own search portal site may not seem too alarming to its subscribers. Nevertheless, PII is still required to target the television advertisements. However, many and perhaps most search sites and content sites accessed online are not owned or controlled by television service providers. In addition, many and perhaps most search sites and content sites do not typically collect PII to identify those users who access them online.

It is therefore desirable to provide systems and methods for delivering targeted television advertisements to users or viewers based on their online behavior (searches performed, sites visited, online ads viewed, an so on), but without using PII to link the television viewer to his or her online activity.

SUMMARY

In a method for delivering targeted television advertisements based on online behavior, IP addresses indicating online access devices and IP addresses indicating television set-top boxes are electronically associated, for a multitude of users. Using user profile information derived from online activity from one of the online access IP addresses, a television advertisement is selected, such as by using behavioral targeting or demographic information, and automatically directed to the set-top box indicated by the set-top IP address associated with that online access IP address. Preferably neither the user profile information nor the electronic association of online access and set-top box IP addresses includes personally identifiable information.

Objects and advantages pertaining to delivery of targeted television advertisements based on online behavior may become apparent upon referring to the exemplary embodiments illustrated in the drawings and disclosed in the following written description and/or claims.

The embodiments shown in the figures are exemplary and should not be construed as limiting the scope of the present disclosure and/or appended claims.

DETAILED DESCRIPTION OF EXEMPLARY EMBODIMENTS

In the following disclosure and appended claims, the term "user" shall be construed as one or more persons receiving online access or television service at a delivery end-point within a household, office, business, or other site or establishment served by an online access provider or television service provider. Thus, delivery of a television ad to "the user" based on access of an online site by "the user" might involve a single person, or one person might access the online site while the corresponding television ad might be delivered to another person in the household, office, business, or other site or establishment. The delivery end-point may be one television set or multiple sets of a given user; likewise, online access may involve one or more computers or other online interface devices of a given user. In some instances, a business having multiple physical locations may be served by separate online or television services, but in other instances, a business may have an internal LAN or WAN that extends service provided to multiple physical locations. Also, some computers and televisions are portable, and can access the service provided from remote locations. Accordingly, the term "user" is intended to refer to that person or those persons who receive the provided services and does not require a fixed or single location in such instances.

In the disclosed exemplary systems and methods for delivering targeted television advertisements based on online behavior, IP addresses indicating online access devices and IP addresses indicating television set-top boxes are electronically associated, for a multitude of users. Using user profile information derived from online activity from one of the online access IP addresses, a television advertisement is selected, such as by using behavioral targeting or demographic information, and automatically directed to the set-top box indicated by the set-top IP address associated with that online access IP address. Preferably neither the user profile information nor the electronic association of online access and set-top box IP addresses includes personally identifiable information. The online access and set-top box IP addresses can be electronically associated for many or all of the users of the multitude before directing television ads to any of the multitude of users. Alternatively, online access and set-top box IP addresses can be electronically associated for one or a few of a multitude of users at any given time as needed for directing television ads to users, with additional IP addresses electronically associated at later times for directing other television ads to additional users.

Figure 1:
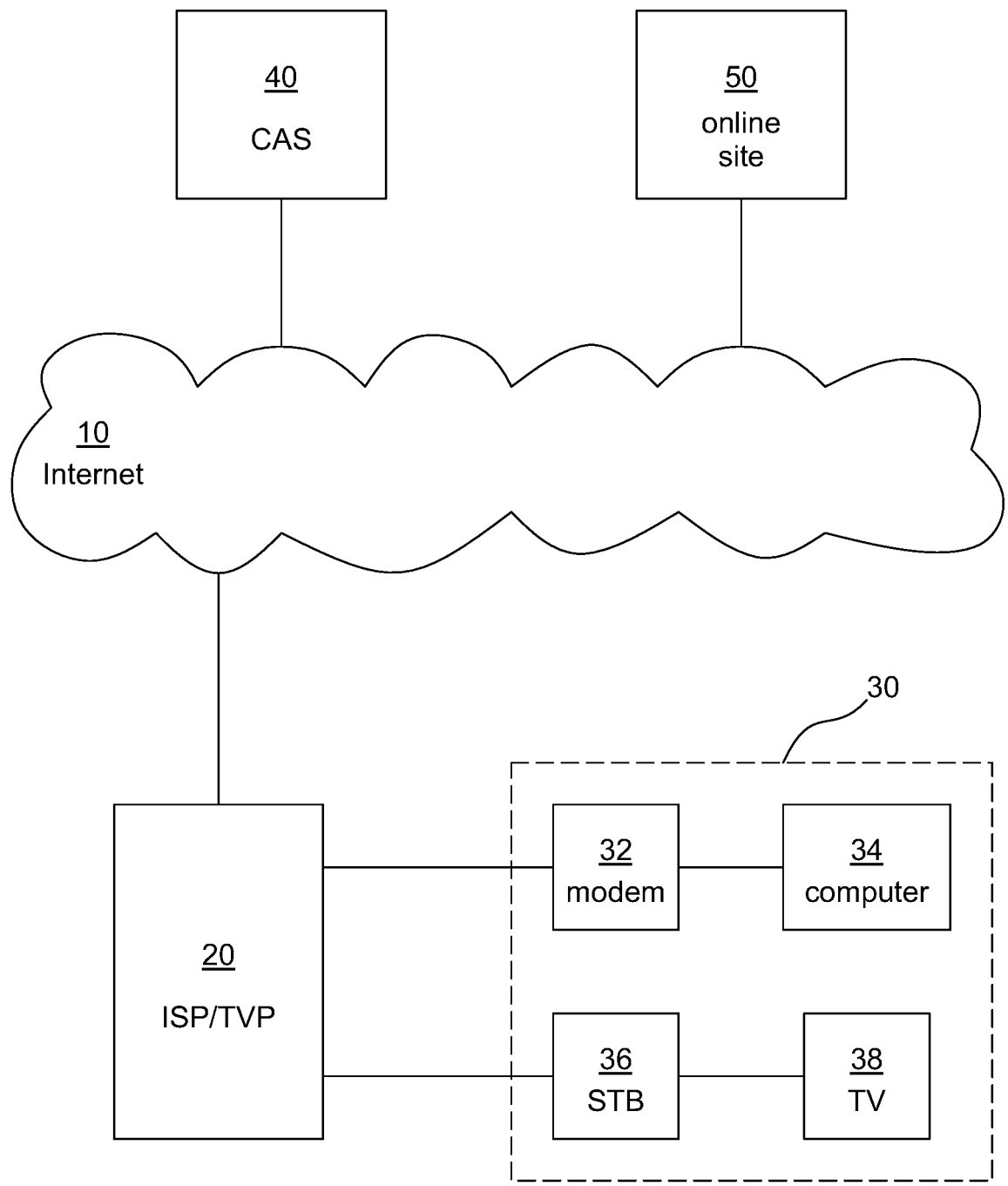
FIGS. 1-5 and 6A-6C illustrate schematically a system for targeting television advertisements based on online behavior in which online access and television service are provided by a common provider.

In an exemplary system for serving targeted television advertisements based on a user's online behavior, the user receives both television service and Internet access from a common service provider that acts as both an internet service provider and a television provider. Accordingly, such a provider entity can be referred to as ISP/TVP. The basic layout of this scenario is illustrated schematically in FIG. 1, wherein online access device 32, online user interface device 34, set-top box 36, and television 38 are associated with a user 30. In some instances online access device 32 and online user interface device 34 are integrated in a single unit, while in other instances they comprise separate units. Likewise, in some instances set-top box 36 and television 38 are integrated in a single unit, while in other instances they comprise separate units. The common service provider 20 can offer Internet access via any suitable online access device 32 (a modem, router, or network adapter suitable for connecting to cable, DSL, wireless, satellite, Ethernet, or any other transmission system) along with the television service provided through set-top box 36 (STB 36). For purposes of the subsequent discussion, online access device 32 shall be described and shown in the figures as a modem and online user interface device 34 shall be described and shown in the figures as a computer separate from modem 32. These descriptions shall not be construed as limiting the scope of the present disclosure or appended claims.

Many users of online access service (i.e., subscribers) are not provided with a static IP address; instead a dynamic IP address (designated as $IP_{modem}$ in the figures) is allocated to the user's modem 32 for online access, typically through DHCP. The online access IP address is allocated by the Cable Modem Termination System (CMTS) if ISP/TVP 20 is a cable company, whereas the online access IP address is allocated by the Digital Subscriber Line Access Multiplexer (DSLAM) if ISP/TVP 20 is a phone company. Other types of online access providers allocate dynamic IP addresses in a similar manner using analogous equipment. It is to the modem IP address (i.e., the online access IP address) that traffic from a remote network is routed to the modem 32 and hence to other devices sharing the modem connection to the remote network; the modem IP address is the only address "seen" by the remote network. The dynamically assigned online access IP address is replaced after some time interval by another IP address allocated to modem 32. ISP/TVP 20 transmits (as in FIG. 2) to a Central Ad Server (CAS 40), or perhaps to multiple CASs, the online access IP addresses of a multitude of users along with corresponding pseudonyms or aliases associated with the IP addresses, e.g., user XY123 is connected to the Internet through a modem 32 that is assigned IP address aaa.bbb.ccc.ddd. Each online access IP address and its associated pseudonym can be transmitted to the CAS 40 immediately upon its allocation or reallocation by ISP/TV 20, which could be advantageous in sending TV ads to the user's STB quickly. Alternatively, online access IP addresses and the corresponding pseudonyms can be transmitted periodically to CAS 40 at any necessary or desirable time interval. The pseudonyms and online access IP addresses are non-PII. The multitude of users can be any set made up of a large number of users and does not necessarily include every user having online access or television service through a particular company or provider. For example, the system described can operate only with respect to a subset of users, such as those users who have capabilities needed to implement this system (e.g., suitable hardware, software, operating system, etc.), those who have done some sort of subscription, or those selected based on criteria as to which operation of the system is considered desirable, less expensive to implement, or profitable. For example, those users might be chosen that have STBs with an operating system, software, or hardware capable of receiving the software required to accept TV ads from a CAS. In any event, the fact that other users may exist as to which the system does not operate is not intended to negate the advantages of the system as to those users for which the system does operate.

Because the user pseudonym and online access IP address are associated with the modem 32, multiple computers or other devices sharing the modem connection for online access will share the online access IP address and the user pseudonym. When the user's STB 36 is used to access a web-based server (for accessing an online programming guide, for example, through the cable television transmission system or through a connection to the Internet), ISP/TVP 20 additionally transmits (as in FIG. 2) to the CAS 40 the IP address allocated to the STB (designated as $IP_{STB}$ in the figures) and associates it with the pseudonym previously associated with the user's modem 32, e.g., user XY123 has an STB at IP address eee.fff.ggg.hhh in addition to a modem for online access at IP address aaa.bbb.ccc.ddd. The association of the user's online access IP address (i.e., modem IP address) and the user's STB IP address at CAS 40 constitutes non-Pll. ISP/TVP 20 knows the IP address of STB 36 because the web based server accessed by STB 36 is typically operated by ISP/TVP 20. If STB 36 has its own modem (an increasingly common scenario as the transition is made from IPv4 to IPv6), the IP address of STB 36 is allocated by ISP/TVP 20 via the CMTS or DSLAM or other similar system, typically using DHCP. Alternatively, in the event that STB 36 accesses the web-based server via a connection 35 to the same modem 32 that provides the user's online access (as in FIG. 3), STB 36 will have reported to CAS 40 the same IP address that was reported for the user's online access modem 32. In all of those cases, the CAS 40 can now associate the IP address for the user's online access (modem 32) with an IP address for the user's STB 36, and the association is not PII.

Figure 4:
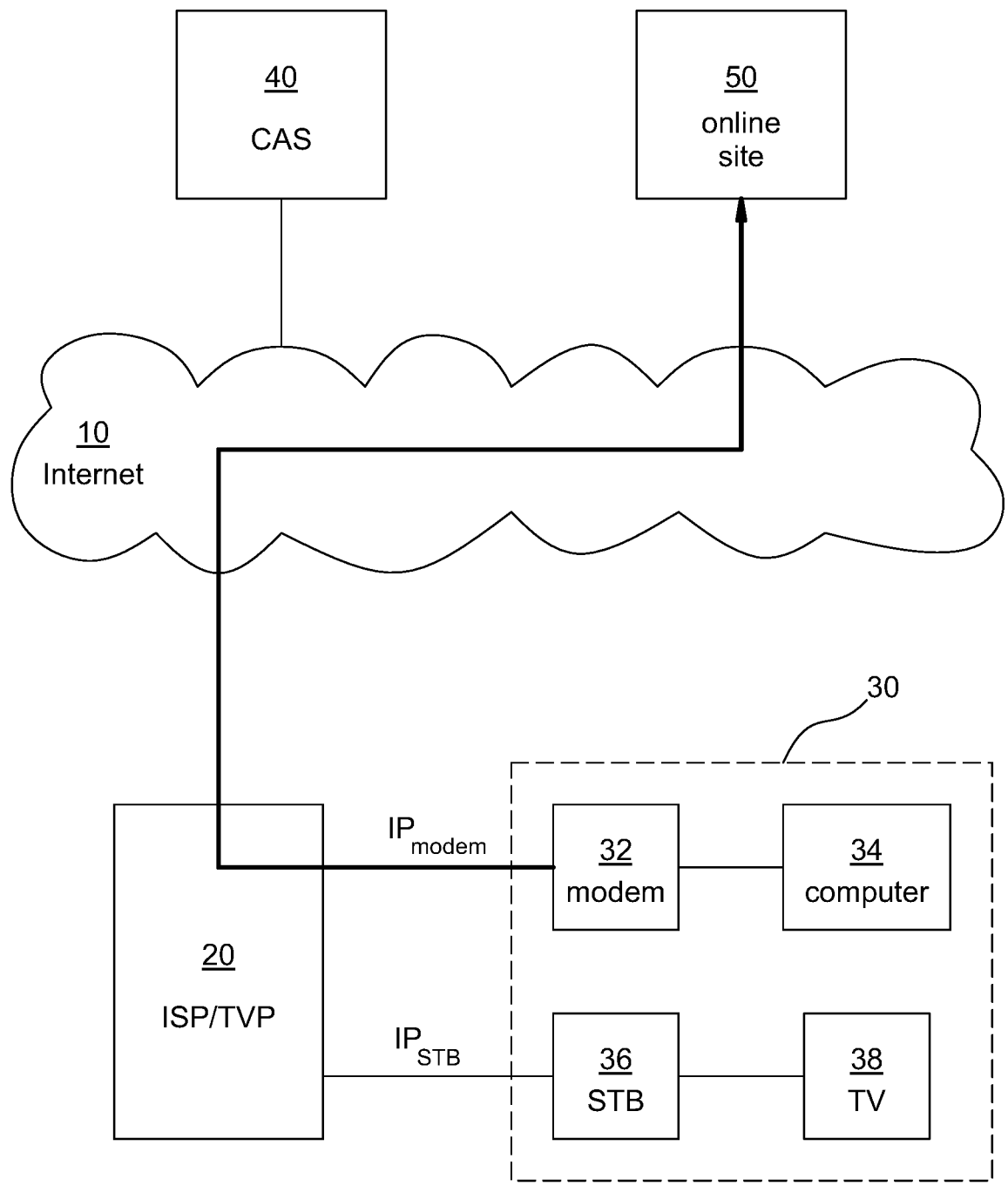
Figure 5:
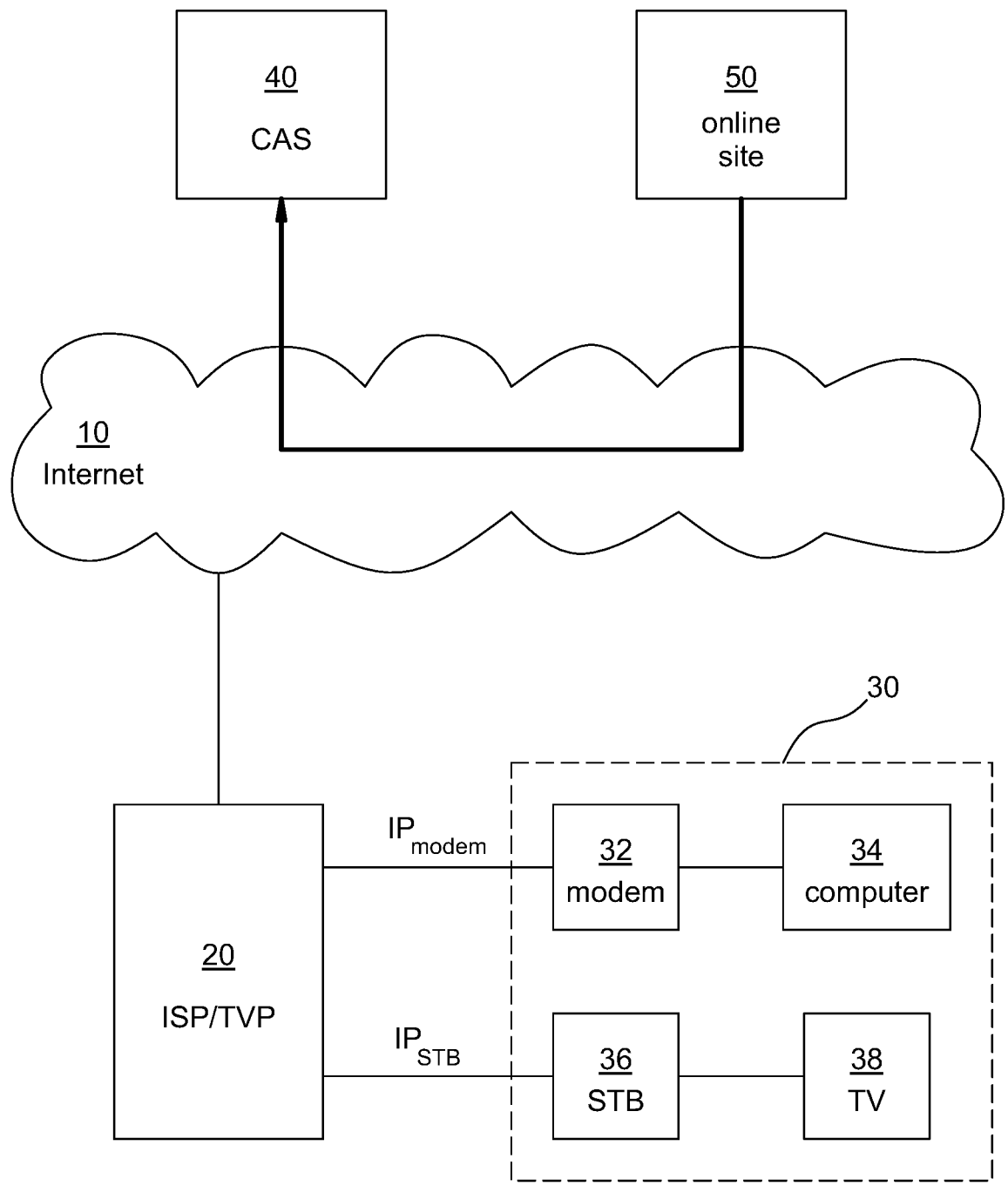

ISP/TVP 20 reports to CAS 40 that user XY123 is accessing the Internet using online access IP address aaa.bbb.ccc.ddd and has STB 36 using STB IP address eee.fff.ggg.hhh. These associations can be stored on CAS 40, or only by ISP/TVP 20, as desired. If user XY123 engages in online activity from IP address aaa.bbb.ccc.ddd (for example, accessing an online site 50, as in FIG. 4), then online site 50 can electronically communicate (as in FIG. 5) an indication (electronic indicia) of the user's online activity to CAS 40, which in turn can cause a television advertisement to be directed to the STB IP address that is associated with online IP address aaa.bbb.ccc.ddd. In this example the online site 50 acts as a profile provider. Without relying on PII, CAS 40 knows that IP address aaa.bbb.ccc.ddd is associated with user XY123 and that user XY123 has a set-top box with IP address eee.fff.ggg.hhh, and CAS 40 causes the television advertisement to be directed to IP address eee.fff.ggg.hhh that indicates STB 36 (as in FIGS. 6A-6C). In some implementations, the television advertisements are delivered to STB 36 using an ad server controlled by ISP/TVP 20, using either an IP-based protocol (an example of which is shown in the referenced figures) or a television delivery system (e.g., a dedicated cable advertisement channel). In one such implementation, that ad server report to CAS 40 the user pseudonym (XY123) and CAS 40 provides that ad server with TV ads targeting user XY123 based on profile information collected from IP addresses reported by ISP/TVP 20 as belonging to XY123. In another such implementation, that ad server reports the IP addresses used by each of a multitude of users of Internet services provided by ISP/TVP 20 along with the times and dates that those addresses were used, and CAS 40 provides that ad server with TV ads targeting each of the multitude of Internet users based on profile information received from the reported IP addresses at the corresponding reported times and dates. Personal privacy is maintained in these implementations because (1) no PII is used by CAS 40 in these implementations, and (2) although ISP/TVP 20 has the capacity to identify the users, the ad server of ISP/TVP 20 does not learn the profile information collected for and received by CAS 40.

The particular television advertisement thus directed typically is selected for delivery to the user's STB 36 based on the user's online behavior (e.g., merely accessing the online site 50, viewing a particular web page, performing a particular search, clicking on a particular link or ad, online shopping or purchases, or other activity). Information about observed online behavior (i.e., indications or indicia of online activity) or collected demographic information can be used by the CAS or by the profile provider to direct a targeted TV ad. In the latter case, the CAS has just the IP address of the profiled user and the identity of the profile provider but not the observed online behavior or demographic information collected by the profile provider, so the CAS can direct a TV ad to the user merely by enabling the profile provider to arrange for the delivery of a targeted TV ad based on the observed online behavior or demographic information available to the profile provider. Examples of profile providers are given above.

The profile provider (such as the proprietor of online site 50) can send an electronic communication to the CAS, preferably automatically such as by having the profile provider's server pre-programmed to send such electronic communication, which electronic communication contains information that the CAS will use in causing a selected TV ad to be transferred to the STB at the proper time. The electronic communication received by the CAS contains information derived from the interaction of the user with an online site (i.e., online activity), which can be online site 50 or another online site for which the profile provider has access to data about user interactions. The electronic communication can take a variety of forms, including: (1) an indicator of the TV ad that should be shown, such as an URL or ad title given by the profile provider to retrieve the correct TV ad from the profile provider's ad server, or even the actual TV ad; (2) an indicator (indicia) of information about the user (likely not PII), such as (a) an IP address pointing to the user, preferably with time and date of visits; (b) a description of profile information about the user, or (c) a code or keyword used by the profile provider to fetch a visitor's profile from a database; or (3) an indicator (indicia) describing user activity, such as a code or keyword indicating (a) certain categories of users, such as users likely interested in mortgages or users likely interested in travel, etc., or (b) more simply, what the visitor searched for on the online site, such as "car insurance." The electronic communication can be sent for each instance of a user interacting with the online site, or a list can be created and transmitted containing information about a number of user contacts. The electronic communication can include any combination of items 1-3 above; for example, a list of visitor IP addresses (preferably with date/time of visits) can be usefully paired with an indicator, in the form of a URL or code, identifying specific TV ads that the profile provider would like to deliver to each of the listed visitors.

Figure 6A:
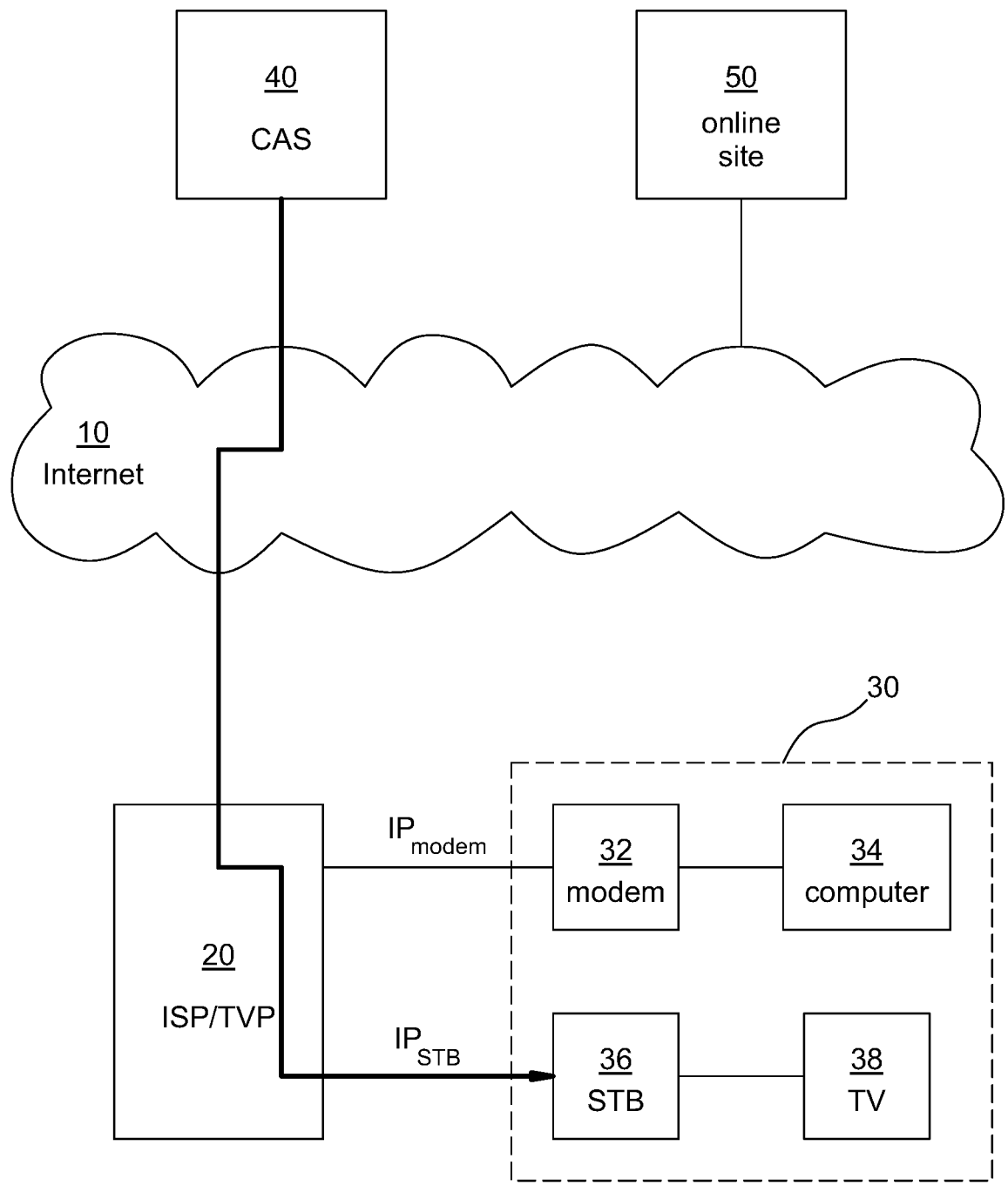
Figure 6B:
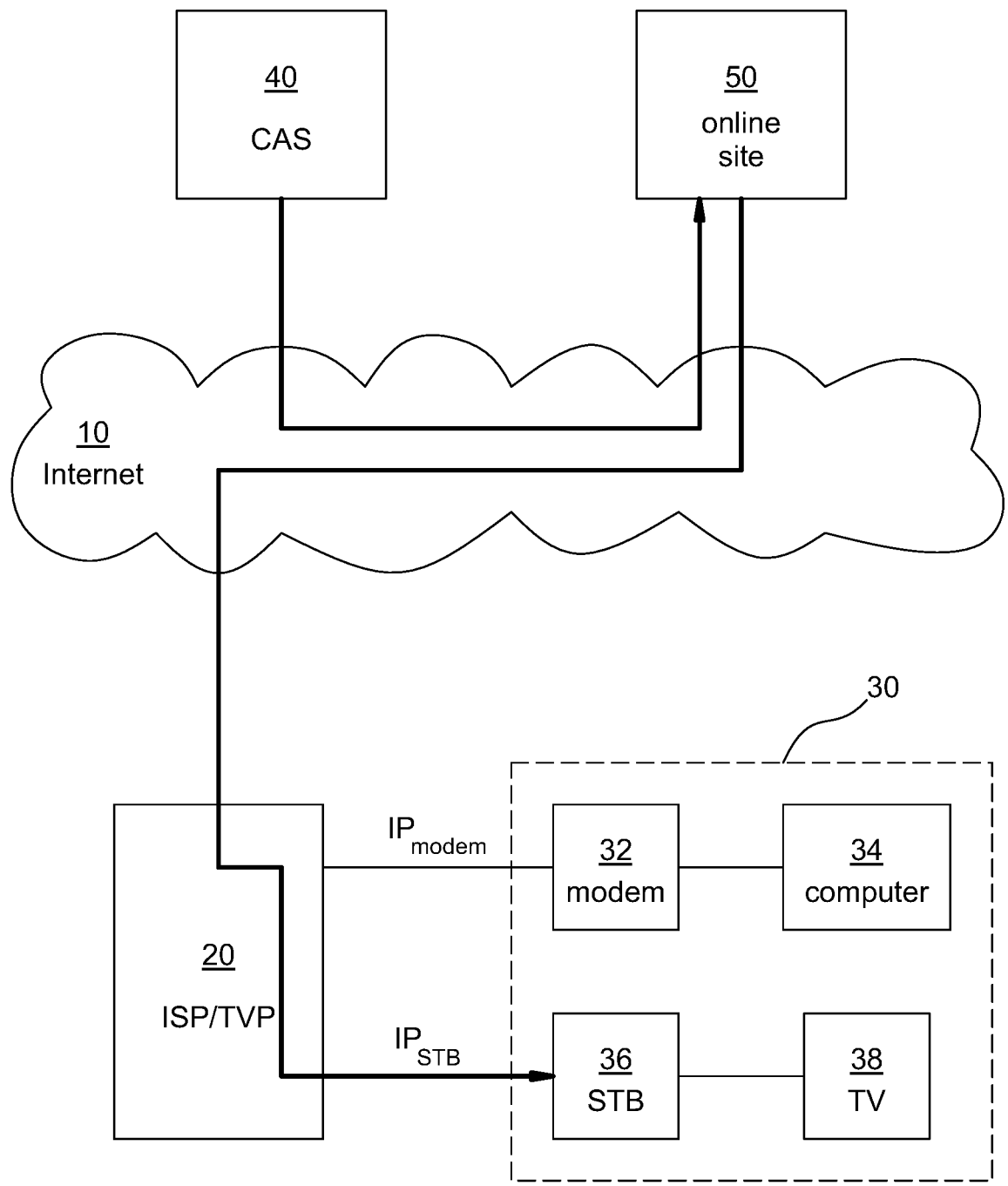
Figure 6C:
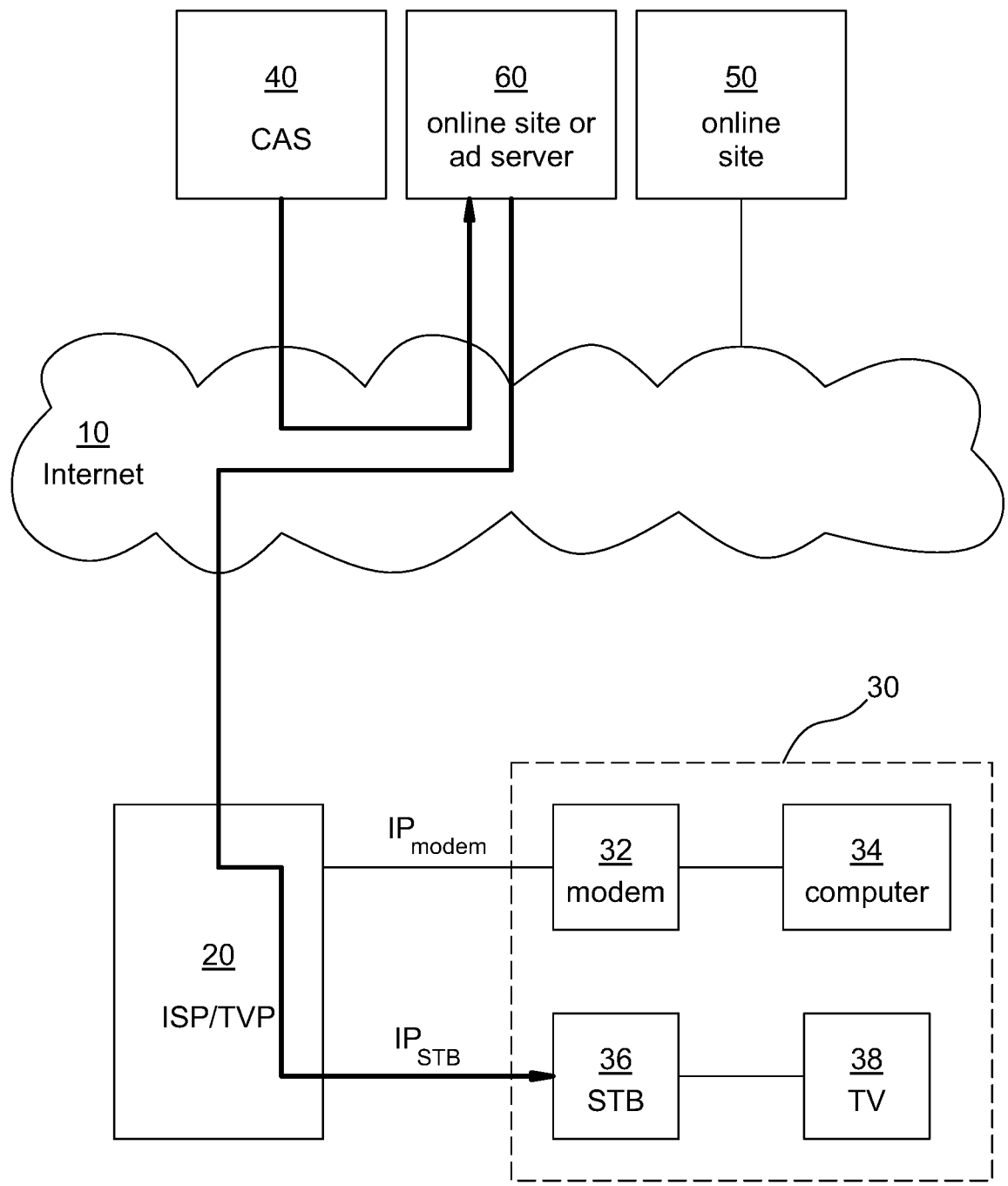

Once requested, the television advertisement can be transmitted to the user's STB in a variety of ways. The advertisement can be previously stored on the CAS and transmitted directly from the CAS to the user's STB (FIG. 6A). The advertisement stored on the CAS can be transmitted from the accessed online site, from another online site, or from another ad server and stored on the CAS as part of the transmission request from the accessed online site, and then transmitted to the user's STB. The advertisement can be transmitted directly to the user's STB from the accessed online site (FIG. 6B) or from another online site or ad server 60 (FIG. 6C). The user's STB can be instructed by the CAS to retrieve the advertisement directly from the accessed site, from the CAS, from another online site, or from another ad server, using for example the URL given to the CAS by the profile provider. In any of those alternatives, the television advertisement need not be transmitted directly to the STB; instead it can be transmitted through one or more intermediate servers (i.e., a server hosted by an ISP, cable company, or telecommunications company, for example). The television advertisement can be streamed or otherwise delivered in real time, or it can be delivered to the user's STB or an associated DVR for later viewing.

Figure 2:
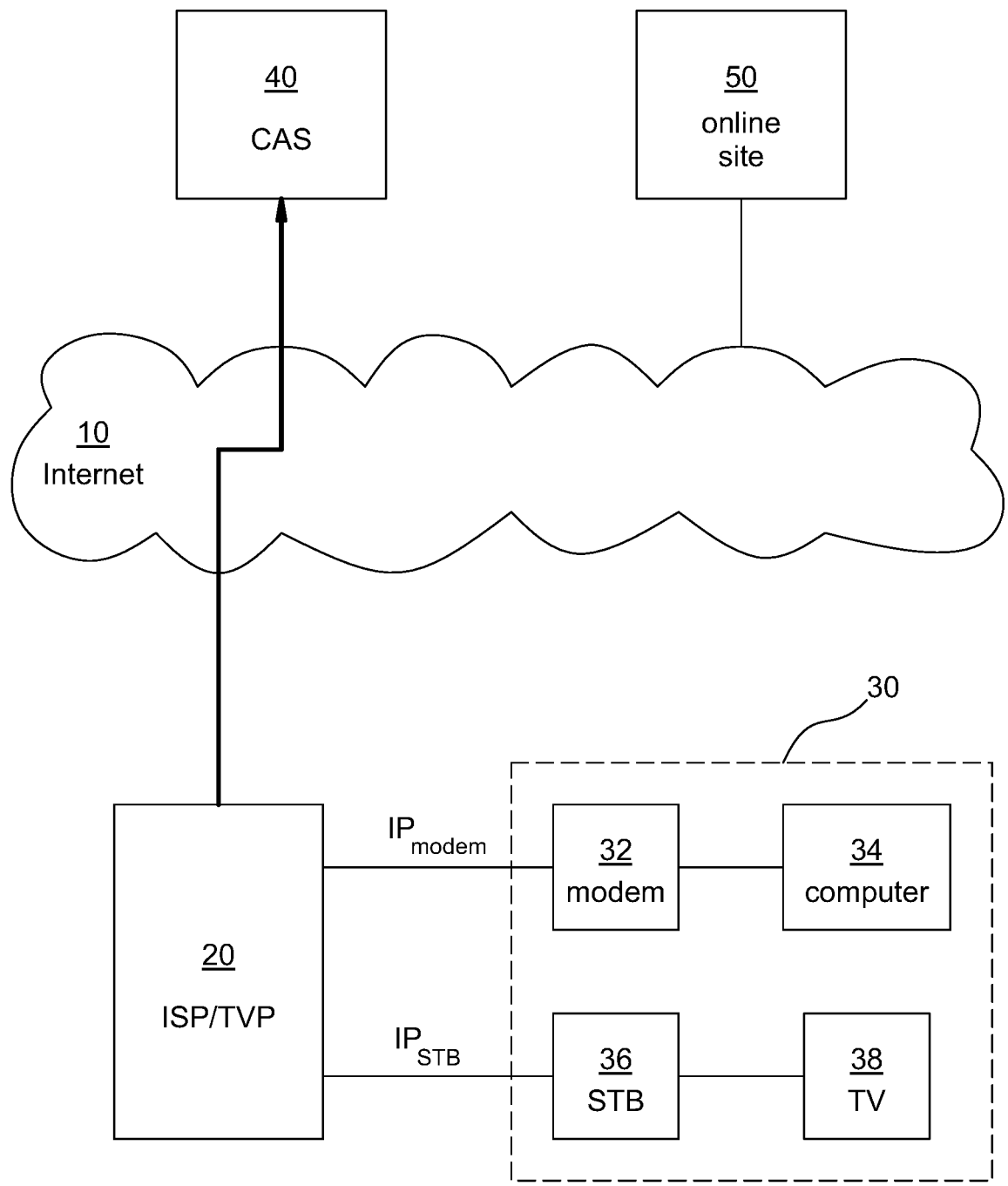
Figure 3:
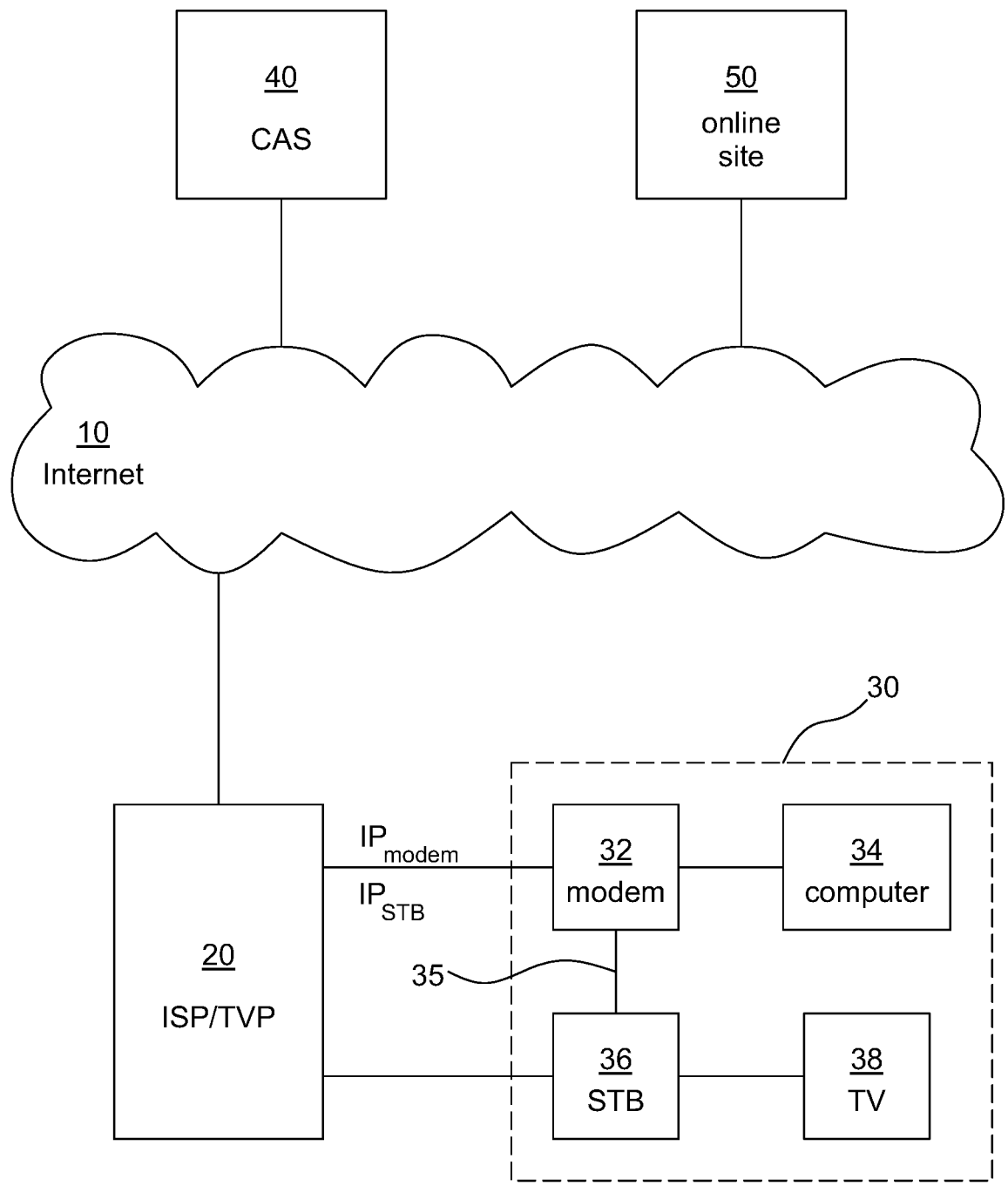

As IP address are dynamically assigned and reassigned, ISP/TVP 20 reports updated online access and STB IP addresses to CAS 40 (as in FIG. 2). The IP addresses and their associated pseudonyms can be transmitted to the CAS 40 immediately upon allocation or reallocation by ISP/TV 20, or can be transmitted periodically to CAS 40 at any necessary or desirable time interval (fixed or variable). Although assignment of a pseudonym associated with both the online access IP address and the STB IP address can facilitate delivery of television ads to STB 36 based on the user's online behavior (via modem 32), it is not necessary.

All that is required is an association between the online access IP address and the STB IP address to enable delivery of television ads based on the user's online activities without relying on PII.

Figure 7:
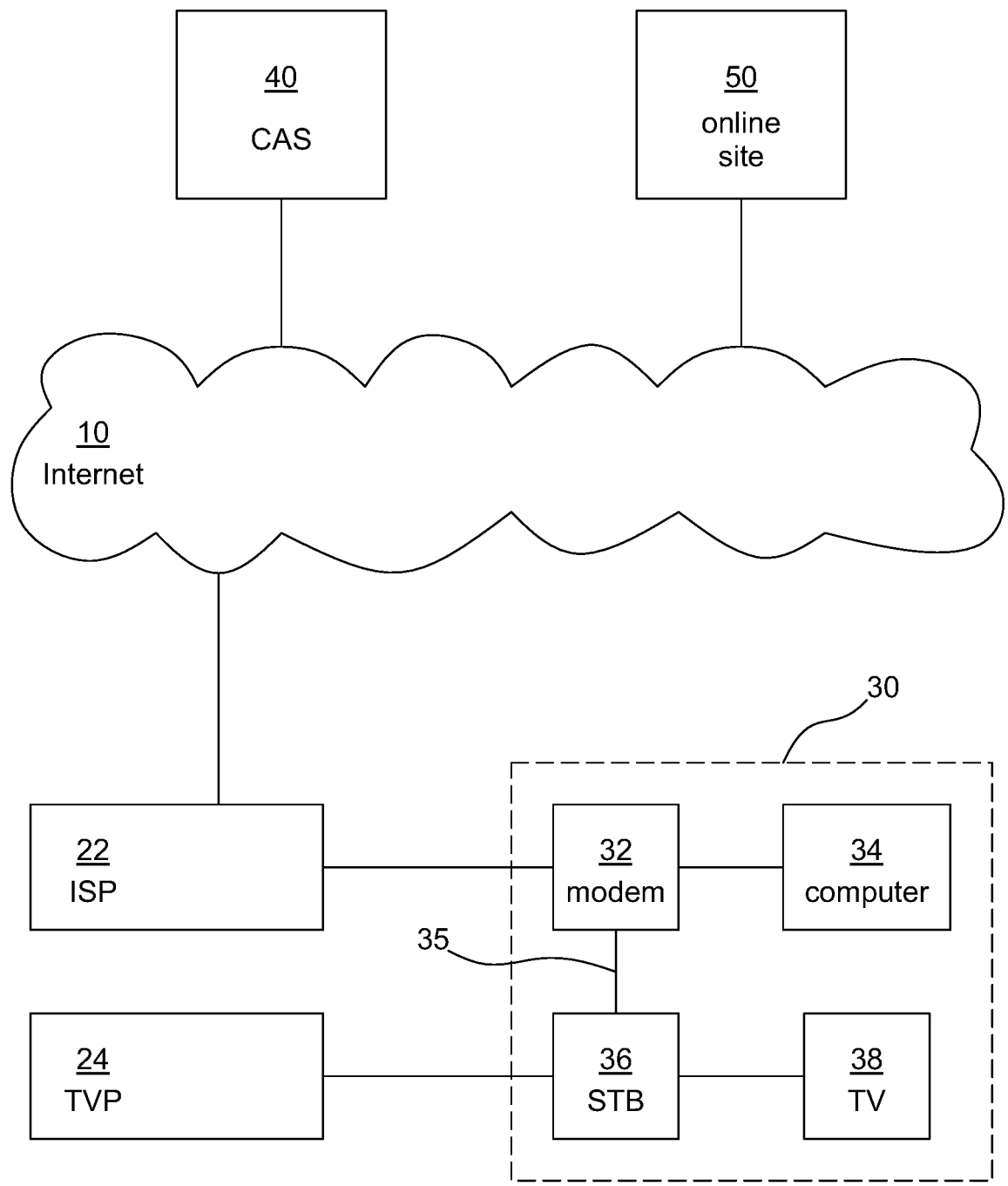
FIGS. 7-10, 11A-11C, and 12 illustrate schematically a system for targeting television advertisements based on online behavior in which online access and television service are provided by different providers.

In another exemplary system for serving targeted television advertisements based on a user's online behavior, the user need not receive both television service and Internet access from a common service provider. The basic layout for such a system is illustrated schematically in FIG. 7, with modem 32 connected to Internet service provider (ISP) 22 for providing online access, and STB 36 connected to television provider (TVP) 24 for providing television service. Again, modem 32 and computer 34 are described as examples of online access and interface devices, respectively; the use of these specific examples shall not be construed as limiting the scope of the present disclosure or appended claims. An online access IP address is assigned to modem 32 as described above. In cases where the user's STB 36 can also obtain online access via the same IP address as the user's online access (i.e., via modem 32), that common IP address comprises the electronic association that can be used to perform targeted television advertising without requiring PII. That case can occur by connecting STB 36 to the user's modem 32 via connection 35, in addition to connecting STB 36 to TVP 24. For example, STB 36 can be connected to a local area network (LAN) that shares device 32 for online access. In such an arrangement, network traffic is routed to a common IP address (i.e., the IP address of modem 32) for STB 36 and other devices connected to the LAN. The user can receive online access from any online service provider via any suitable modem 32 (for cable, DSL, wireless, satellite, or any other transmission system) or other suitable online access device and can receive television service from any suitable television service provider through STB 36. The term "common IP address" denotes the IP address of a modem or other online access device to which remote network traffic is routed for each of multiple devices sharing a common connection to the remote network through that modem, e.g., the IP address of a modem connecting to the Internet a router in a local area network (LAN) would constitute the common IP address for multiple devices connected to the LAN for online access, even though those multiple devices typically also have individual IP addresses assigned by the router for routing traffic within the LAN. An online site or server accessed by any one of the multiple devices only "sees" the common IP address (the modem IP address).

Figure 8:
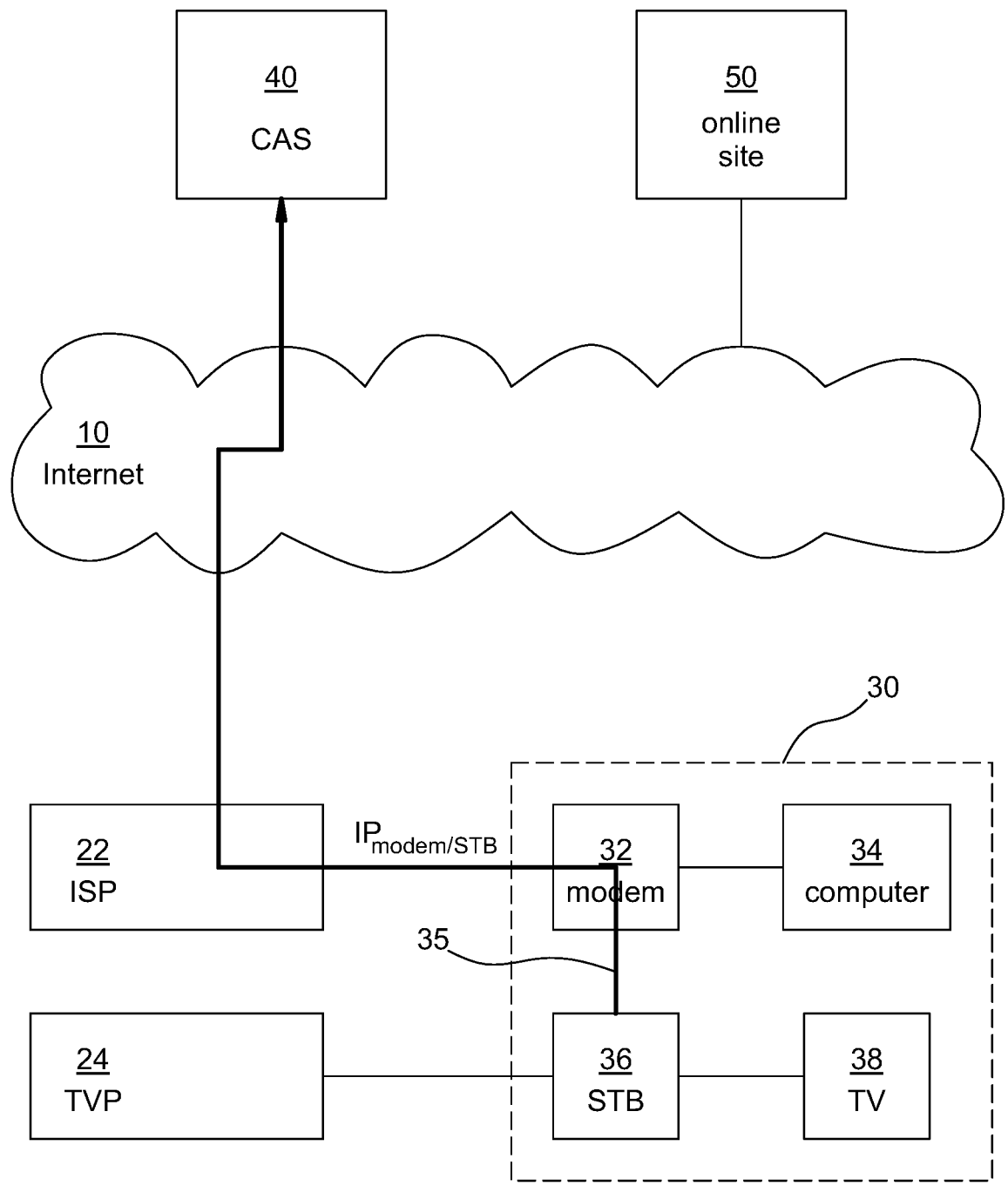

In an exemplary implementation, a user's STB 36 can periodically contact a CAS 40 (or multiple CASs) via the IP address of the user's modem 32 that is common to STB 36 (as in FIG. 8). The common IP address is dynamically assigned by ISP 22 to the user's modem 32 or other online access equipment. Modem 32 can include a router to route network traffic properly among the user's computer (or computers or other devices) 34 and the user's STB 36. Alternatively, a separate router can be employed, or computer 34 or STB 36 or television 38 can include routing functions, for properly routing network traffic passing through modem 32, with STB 36 providing routing functions or being connected to the separate router, to computer 34, or to television 38 as appropriate. STB 36 reports the common IP address to CAS 40 with which it is in contact. However, STB 36 itself might not know the common IP address it is using, because it communicates through modem 32. In such circumstances, STB 36 nevertheless can report the common IP address to CAS 40 simply by initiating communication through modem 32 to CAS 40, thereby enabling CAS 40 to extract the common IP address from the communication. The common IP address enables delivery of television ads to STB 36 based on access of an online site via the common IP address (or based on other user profile information derived from online activity observed as originating from the online access IP address of modem 32, i.e., from the common IP address). The existence of the common IP address associates the online access IP address and the set-top box IP address. Again, this does not constitute PII. The time interval for the periodic contact of the STB and the CAS can be set to any appropriate time period, e.g., every five minutes, every hour, or at some other necessary or desirable time interval. The time interval can be selected to be commensurate with a typical or average time interval for dynamic reassignment of the online access IP address by the user's Internet Service Provider. The selected time interval can be made adjustable if needed or desired. Alternatively or additionally, the contact between the STB and the CAS may not be set to occur at a fixed time interval but rather irregularly, such as instances where it is triggered by dynamic reassignment of the online access IP address by the ISP.

Figure 9:
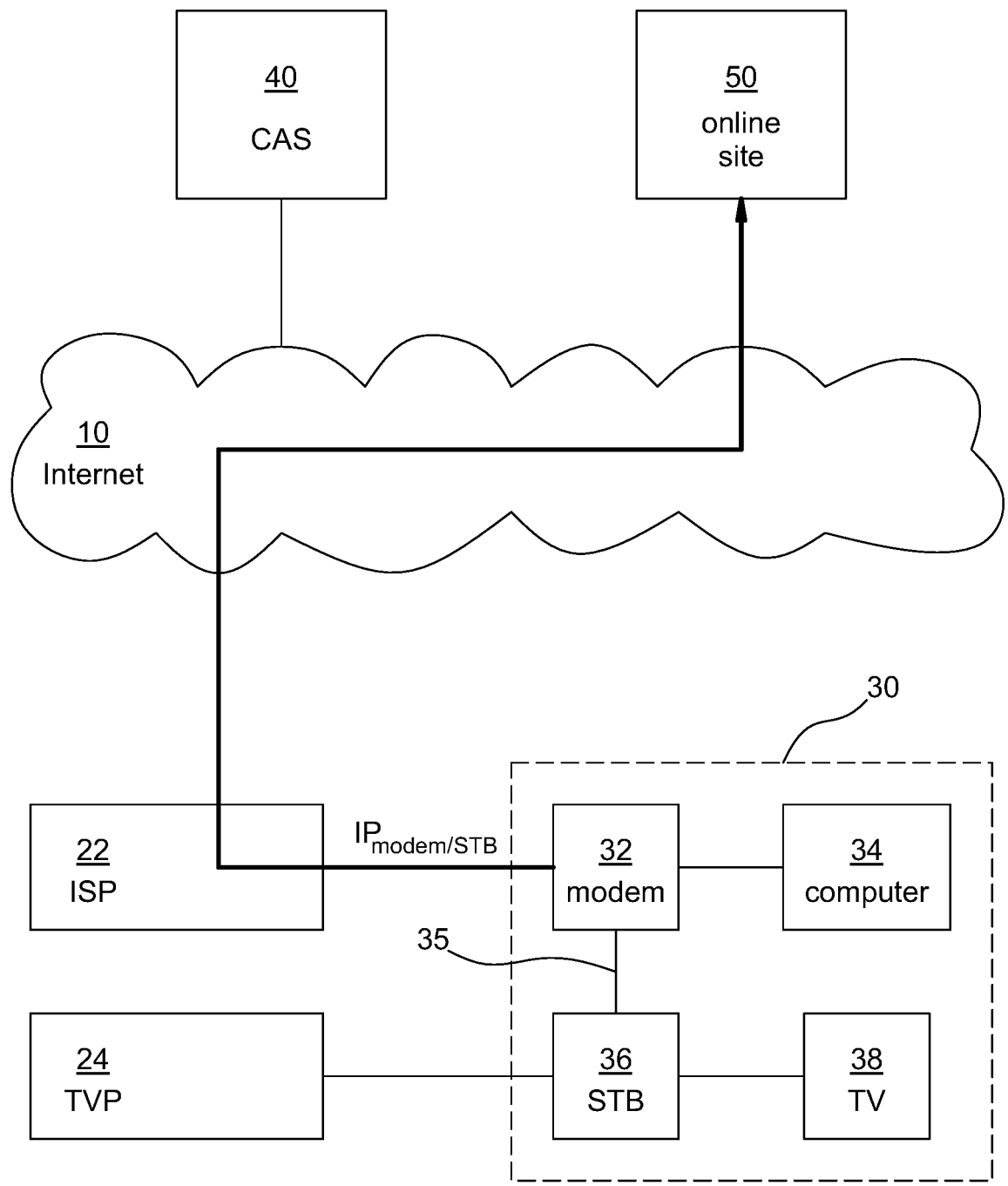
Figure 10:
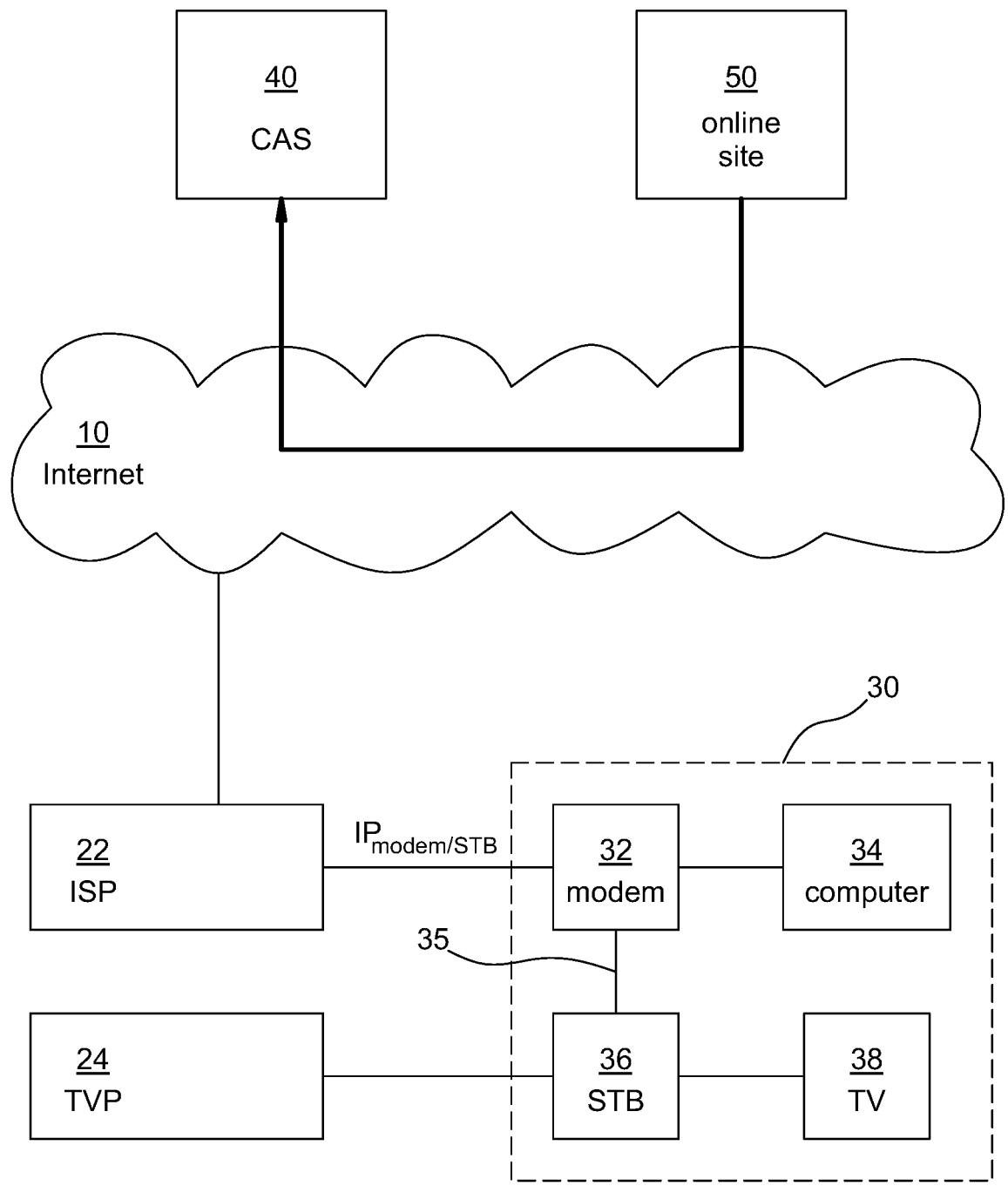
Figure 11A:
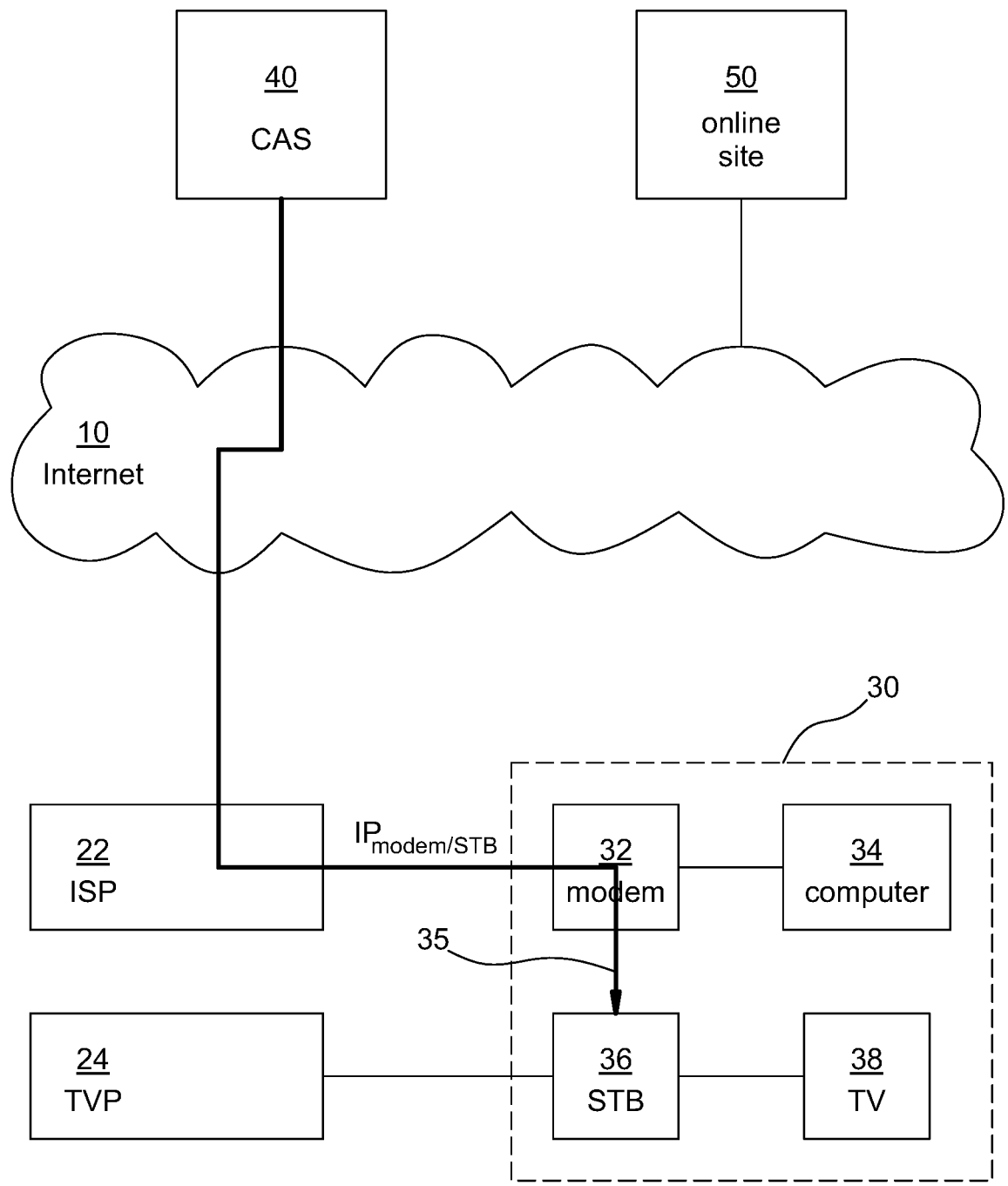
Figure 11B:
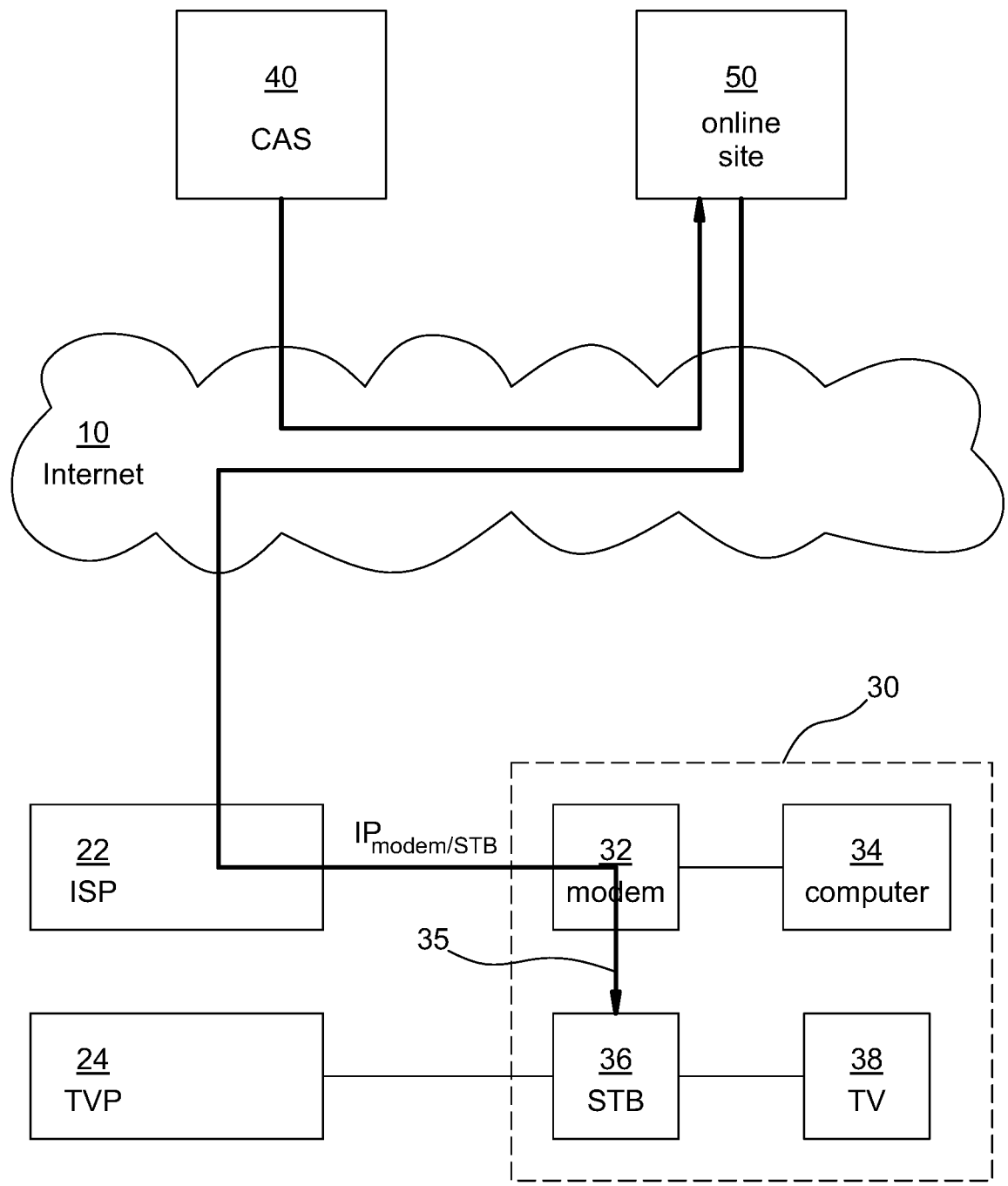
Figure 11C:
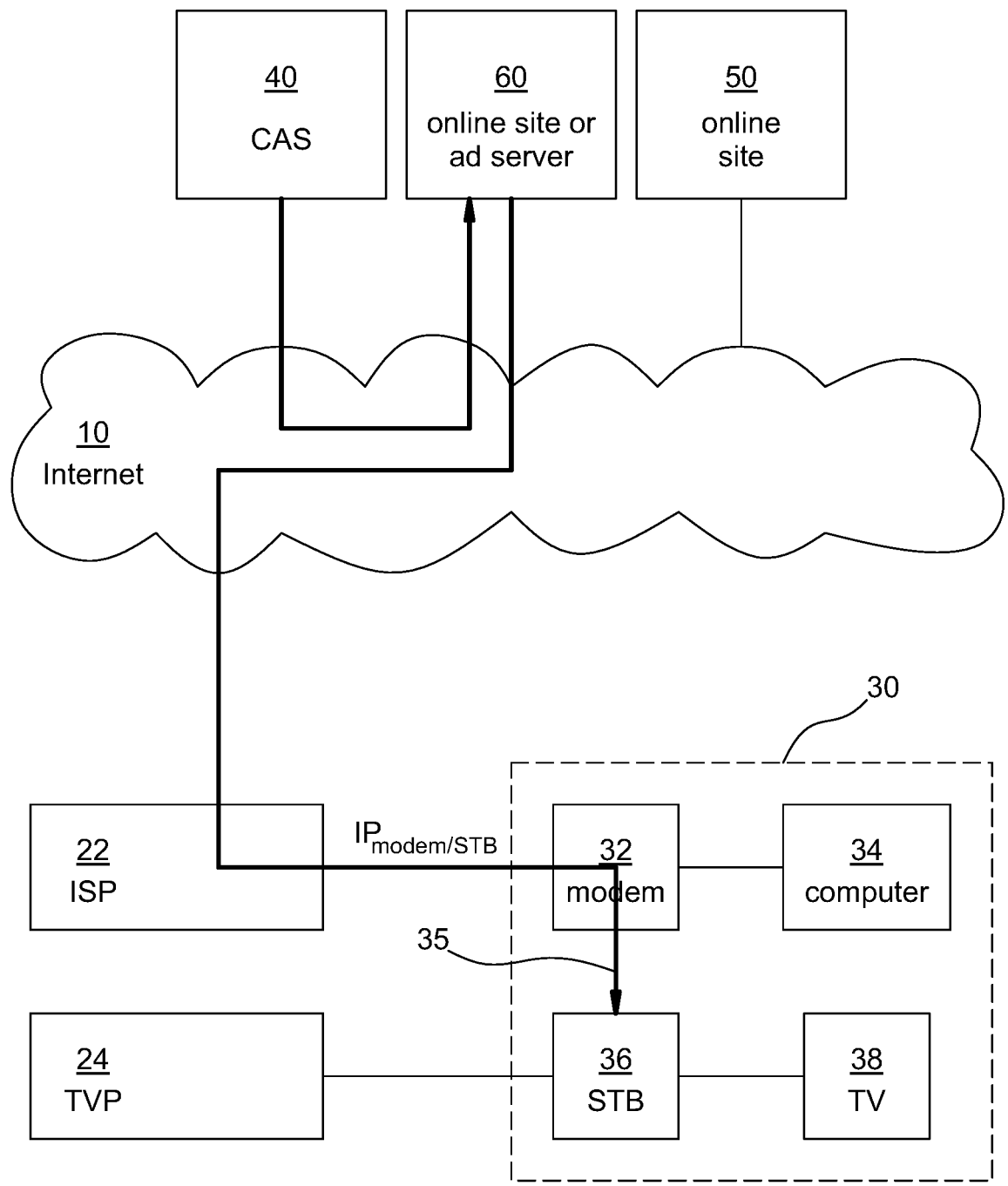

When a user engages in online activity (for example, accessing online site 50, as in FIG. 9), user profile information derived from the user's online activity from the online access IP address can be delivered electronically to CAS 40 (from the accessed site 50 as in FIG. 10, or from another profile provider), which in turn can cause a targeted television advertisement to be directed to the user's STB, if there is an STB IP address associated with the online access IP address. In the example shown in FIG. 9, online site 50 acts as a profile provider, and the user's online access IP address (the common IP address), from which the online site was accessed by the user, is included with the electronic delivery. CAS 40 causes the television advertisement to be directed to STB 36 at the common IP address (as in FIGS. 11A-11C), in accordance with the alternative methods for delivery of the TV ad discussed herein in connection with FIGS. 6A-6C. The particular television advertisement thus transmitted typically is selected for delivery to the user's STB 36 based on the user's online behavior (examples of various sorts of online behavior, or demographic information provided or determined online, are discussed above). The accessed online site 50 transmitting the electronic communication (examples of which are listed above) can be any profile provider, or any profile provider having access to information about user activity with respect to online site 50 can transmit the electronic communication (examples of alternative types of profile providers are also given above).

The television ad can be directed to the STB that most recently reported to CAS 40 as the common IP address the online access IP address from which online site 50 was accessed. In that case, the IP addresses can already be associated when the user profile information is used or the association can be created when the user profile is received or afterwards. Or the television ad can be directed to the STB that next reports that IP address to CAS 40 as the common IP address. In that case, the IP addresses might not be associated until the STB and CAS 40 are next in communication with each other and the STB IP address is received by CAS 40. Associations between STBs and online access IP addresses could be stored for future usage or could be created in real-time when a STB communicates with a CAS to receive TV ads and not stored for future usage (i.e., the association is dropped as soon as the TV ads are delivered to the STB). If the periodic contact interval is sufficiently small relative to the typical or average time interval between reallocation of IP addresses, then it is likely that those two IP addresses will be the same and that the television ad will be directed to the correct STB. There will be a small fraction of television ads that are misdirected, if the online access IP address is reassigned between the accessing of the online site (i.e., deriving the user profile information) and the relied-upon contact between the user's STB and the CAS (i.e., associating the IP addresses). That fraction can be reduced by reducing the periodic time interval between STB reports of its common IP address to the CAS or configuring the STB to report changes to the common IP address (i.e., to enable updating of the association between the IP addresses). Associations between online access and STB IP addresses can be stored for future use, or the IP addresses can be associated in real-time only when an STB communicates with a CAS to receive TV ads and not stored for future use (e.g, the association can be purged upon directing the TV ads to the STB).

Instead of relying on or waiting for contact from the STB reporting its common IP address to one or more CASs, the online site accessed by the user could instead query one or more CASs to find an STB with a common IP address matching the online access IP address from which the online site was accessed. If a matching STB IP address is found, a request is transmitted to the corresponding CAS to transmit a television advertisement to the STB. If the query, match, and request are completed sufficiently quickly, then the probability can be kept low that a television ad will be directed to the wrong STB.

In another exemplary implementation, the user's STB 36 can be assigned an identifier, which need not include PII. Such an identifier can be permanently or temporarily assigned to STB 36. Examples of such identifiers could include an equipment serial number or a portion thereof, a device MAC address or a portion thereof, a username, a pseudonym, a confirmation number, a tag, or any other identifying code or data element. The CAS can place an identifier on the STB the first time it is in contact with the STB and read or amend the identifier every time afterwards the STB and the CAS are in contact. Such an identifier is an analogy of a "cookie" used by online servers to recognize visitors' computers. The identifier can include the IP address the STB is using when in contact with the CAS, so the next time the CAS and the STB are in contact, the CAS could compare the IP address then used by the STB with the previous IP address used by the STB without looking in a database. From a privacy perspective, there is an advantage to using an identifier placed by the CAS on the STB, because it enables the user to control the identifier from user's TV screen and set privacy settings to match user preference. A user may, for example, erase the identifier, alter the identifier to inform the CAS the next time it is in communication with the STB that the user is not interested in targeted ads, interested only in ads targeting online behavior from the last seven days, interested in ads in certain categories only, or interested in all types of ads except for certain excluded categories (e.g., adult content). In addition to reporting the common IP address to CAS 40, STB 36 can also report the identifier. When an online site 50 is accessed from the common IP address, online site 50 requests that a television advertisement be transmitted to the STB having the common IP address. The identifier of the STB most recently reporting the common IP address before the request is compared to the identifier of the STB that next reports that IP address to CAS 40 after the request. If the compared identifiers match, then it is nearly certain that the STB corresponds to the same user online access IP address from which online site 50 was accessed and the television advertisement is correctly directed. If a unique identifier is used (such as a complete MAC address or a complete device serial number) then misdirecting the television ad is virtually impossible. Even if the identifier is not unique (e.g., a partial MAC address or serial number, or a simple four-digit number), it is still highly unlikely that a given IP address would be reallocated between STB's that happen to have the same identifier. Use of an identifier can enable accurate directing of television ads to the correct STB while requiring the STB to report its IP address to the CAS less frequently, reducing network traffic and other resource requirements.

In another exemplary implementation, instead of reporting the common IP address of STB 36 to CAS 40 relatively frequently, STB 36 can be configured to store its common IP addresses and corresponding times and dates that each of the addresses is assigned to modem 32 (and hence also to the LAN to which the STB 36 is connected). The common IP address can be periodically sampled and the sampling stored (e.g., every 1, 5, or 10 minutes, or some other suitable interval), or the specific times and dates of IP address reassignments can be stored with the corresponding IP addresses. STB 36 can be configured to periodically (e.g., every 4, 6, 12, or 24 hours, or some other suitable time interval) report to CAS 40 all of the common IP addresses assigned to modem 32 and the corresponding dates and times they were used for some preceding span of time (e.g., 1, 7, 14, 30, or 90 days, or some other suitable interval). Alternatively, the common IP address can be stored on the STB as part of a cookie or tag set and subsequently read or reset by CAS 40. CAS 40 also can be configured to receive IP addresses and corresponding access times and dates for all visitors to an online site 50 that wishes to deliver television advertisements based on online user behavior. Online site 50 periodically reports to CAS 40 (as in FIG. 10) all IP addresses from which the online site was accessed during some preceding period, along with the corresponding times and dates. The frequency and time periods of the online site's reporting can be similar to those of the STB reporting, or they can differ substantially, as needed or desired. The two lists (one from the online site, one from the STB) of IP addresses are compared, and delivery of a television advertisement is requested if any matches are found, i.e., whenever it is found that the STB was connected to a modem that was assigned an IP address at a time and date when the online site was accessed from that IP address. Such cross-matching ensures accurate delivery of the television advertisement and requires substantially less communication between the STB and the CAS.

The common IP addresses (and corresponding times and dates) can be stored on the CAS. Alternatively, privacy can be enhanced in this implementation by storing the common IP addresses (and corresponding times and dates) locally on the STB, instead of on the CAS, so the only device that monitors the different IP addresses assigned to the same access device is the STB. If stored, whether on the STB, on the CAS, or elsewhere, the list of common IP addresses can be purged. Purging of the IP addresses can be done periodically, at any suitable time interval, and can be manual or automated. Similarly, the list of online access IP address (and corresponding times and dates) from which an online site has been access can be purged. The STB can be employed to set privacy options, thereby enabling the user to control at least partly if and how TV advertisements are targeted. For example, the user might choose whether or not, or for how long, the CAS or STB will record and retain the IP addresses assigned to the user's modem, or can choose to erase all presently stored IP address data.

Typically a router does not provide the IP address of the cable, DSL, or other modem to the computer(s) or device(s) connected to it or to a LAN managed by it. STB 36 requires this information to store it for later reporting to CAS 40. One method for enabling this functionality includes providing an Internet server (perhaps as part of CAS 40, or perhaps an independent server) that receives periodic requests from STB 36 and replies to STB 36 with the common IP address (i.e., the IP address of modem 32, through which STB 36 is provided with online access). Any other method for monitoring the common IP address can be employed, including configuring the modem 32 to directly report its IP address to STB 36. STB 36 periodically monitors the IP address of the modem 32 at a selected time interval (described above), and stores the modem IP address (i.e., the common IP address) and the corresponding times and dates each common IP address was allocated to the user's modem.

Figure 12:
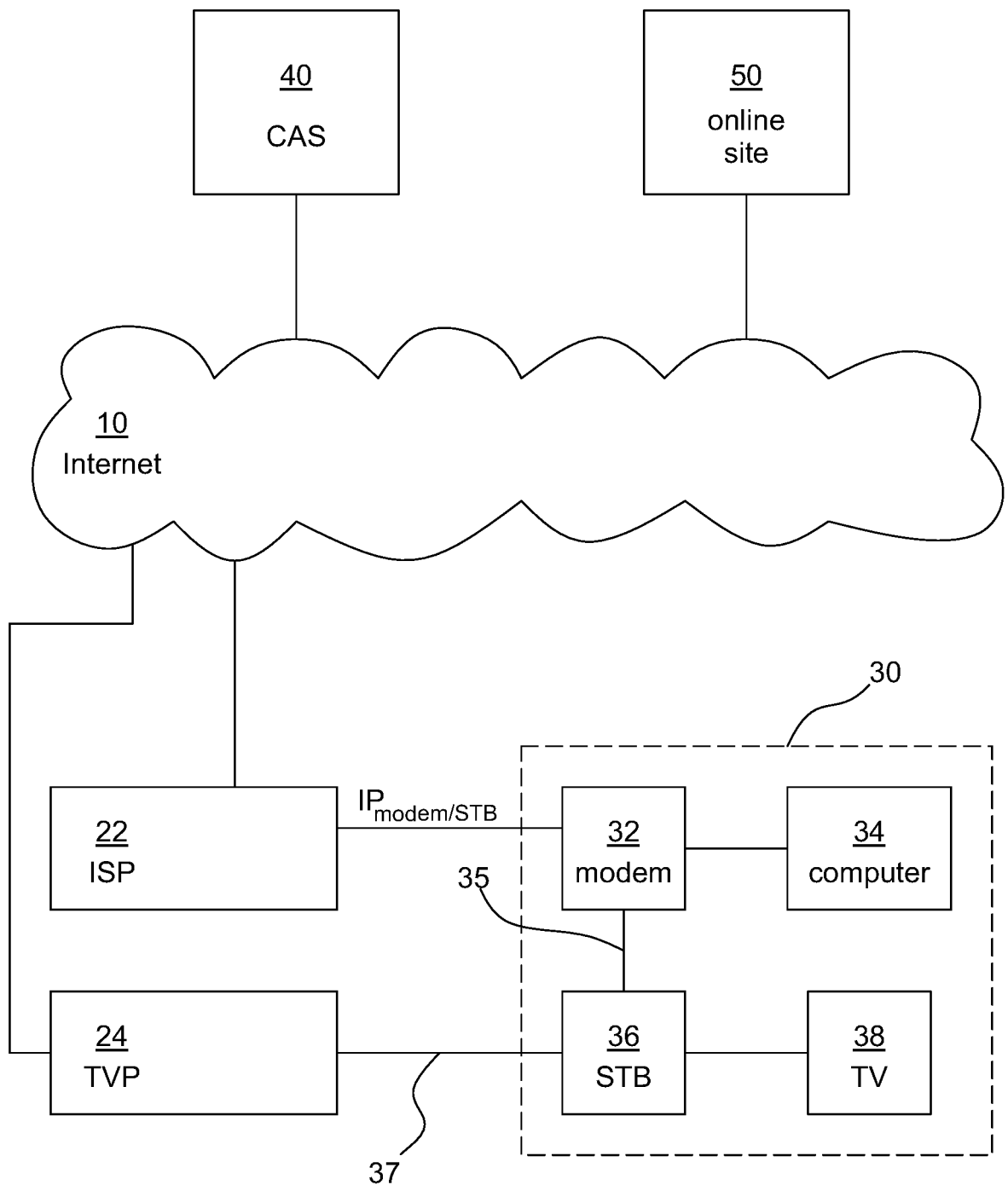

In any embodiment or implementation in which STB 36 reports IP address data to CAS 40 (either stored on STB 36 or for storage at CAS 40), that communication can be achieved in several ways. STB 36 can report the common IP address through the online access modem 32. Alternatively, STB 36 can report to CAS 40 through a dedicated upstream data channel 37 that is part of the television system (as in FIG. 12). The reported IP address data need not be transmitted directly to CAS 40; instead it can be transmitted to an intermediate server (e.g., hosted by an ISP, cable company, or telecom company).

It should be noted that some STBs have a dedicated modem and typically would not need to obtain online access through the user's online access modem to deliver television service to the user. However, other functionality of an STB includes, or is expected to include, delivery of audio, video, images, and other content from a user's computer 34 or other networked devices to the user's television 38. To provide that functionality, STB 36 must be connected to the same LAN or router as the user's computer(s), even if the STB has its own modem. Although using its own modem for most of its functions, such an STB would still have additional online access through the user's online access modem 32, enabling the user's online access and STB to have a dynamically assigned common IP address (as described above). The STB can report the common online access IP address through the online access modem 32 at the common IP address or through the STB's dedicated modem at its own IP address. The television advertisement transmitted to the STB can be received through the online access modem 32 at the common IP address or can be received through the STB's dedicated modem at its own IP address (if, for example, the CAS is provided with the STB modem IP address along with the common IP address).

Figure 13:
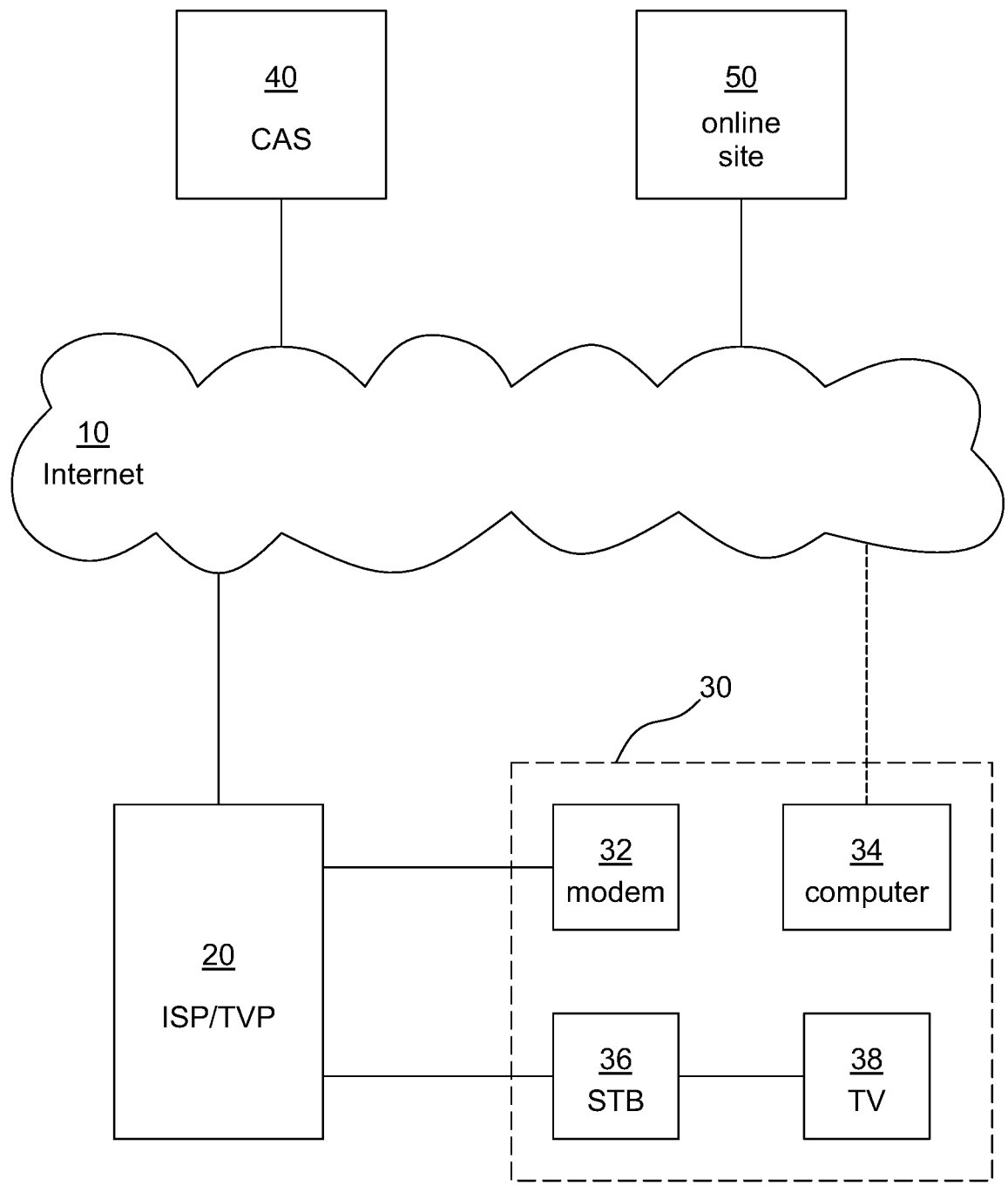
FIGS. 13 and 14 illustrate schematically a system for targeting television advertisements based on online behavior in which online access is provided by a mobile device.
Figure 14:
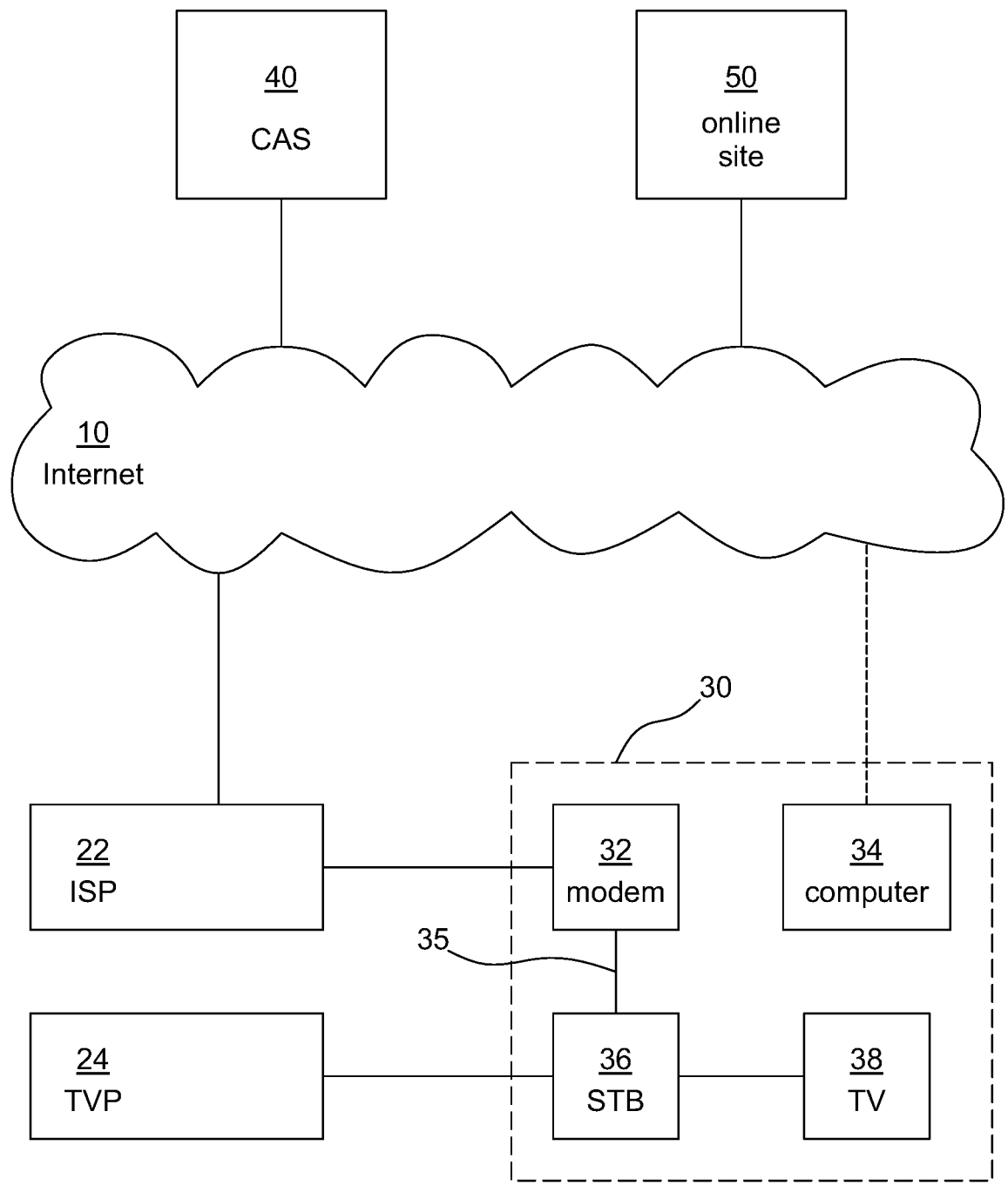

However the user's online access and STB IP addresses are electronically associated, the association can be maintained even if the online user interface device 34 is a mobile device (e.g., an Internet-enabled cell phone, handset, PDA, or laptop computer) that is intermittently disconnected from modem 32 and is connected to the Internet through another connection (e.g., another LAN, a wireless hotspot, or a cell phone network, as in FIGS. 13 or 14). When connected to the Internet through modem 32 (as in FIGS. 1 or 7), online sites visited using such a mobile device 34 can request delivery of television advertisements to STB 36 in any of the ways described above. Mobile device 34 can be programmed to store, in much the same manner as described above for STB 36, its online access IP addresses and the corresponding dates and times when disconnected from modem 32 and connected to the Internet by another connection (i.e., when "roaming"). When mobile device 34 is later reconnected to modem 32, those stored roaming online access IP addresses, along with the corresponding dates and times, can be transmitted to CAS 40 as described previously. Television advertisements can be directed to STB 36 based on matches found between the roaming online access IP addresses (and dates and times) from mobile device 34 and online access IP addresses (and dates and times) reported by online site 50 to CAS 40 for visits to online site 50.

Furthermore, the selected television advertisements can be directed to STB 36 even after a mobile device 34 is disconnected from modem 32 and begins accessing the Internet through roaming online access IP addresses. A tag or cookie placed on mobile device 34 (or stored in a database elsewhere, such as on CAS 40, by CAS 40, or somewhere accessible on STB 36 or its associated LAN), which tag or cookie can include online access IP addresses (and corresponding dates and times) of modem 32 or STB 36. Those IP addresses (and dates and times) can be reported to CAS 40 by mobile device 34 while roaming (following a redirect from visited online site 50 for example), and a television advertisement can be directed to STB 36 (using the IP address reported by the roaming mobile device 34) at the request of online site 50. Because a new IP address might be assigned to modem 32 and STB 36 after roaming device 34 is disconnected from modem 32, an identifier for STB 36 (as described earlier) can be employed to verify that the television advertisement is directed to the correct STB. The identifier can be stored on mobile device 34 as part of the cookie or tag.

However the user's online access and STB IP addresses are electronically associated, the STB can be configured to filter the targeted television advertisements based on user preferences. For example, a user might program the STB to reject certain ad categories (e.g., women's clothing, or health ads) and accept certain other ad categories (e.g., automobile ads, electronic equipment ads, or travel ads). The filtering can be configured as "opt in" (i.e., receive ads only in selected categories) or "opt out" (i.e., receive ads in all but selected categories). In another example, a user might filter ads based on how long ago an online site was visited; e.g., the user might choose to accept ads only from Internet sites visited in the last seven days. Such filtering or preference data can be applied before or after an ad is selected to be transmitted. The STB can be configured to notify the CAS or the online site to prevent selection, or transmission, of the television advertisement, or the STB can accept the advertisement but then not display it to the user. In an exemplary implementation, such user preference or filtering information can be stored in the STB as part of a cookie or tag set and subsequently read or amended by the CAS. User preference or filtering information can be stored in any suitable location or format.

In another implementation, no software is required to be installed on the mobile device, only cookies are placed on the device, which makes implementation in the market much simpler. Once a STB is confirmed to have been using a certain IP address at a certain date and time (for example by having a uniquely tagged STB consecutively communicate with the CAS using the same IP address or by the STB reporting the common IP address recorded by it as used by the online access device), the CAS database can be searched to find all the computers, mobile devices, and other STBs that used the same IP address at the same date and time, and those will be assumed to be devices that are part of the same household and using the same LAN. Then, an association or link is created among the devices, by linking the device identifiers or tags with the STB's identifier in the CAS database or by placing linking codes or information identifying the linked devices within the identifiers (cookies) of each of the devices along with the date and time the association was created. The association is kept for no more then a pre-determined period of time (such as seven days), to ensure that the delivered TV ads will be based only on online activity of those people that live in the house and not on online activity of people that happened to use the house's LAN only once, such as houseguests.

Once the association is created, profile information (both behavioral and demographic) collected about the computers and mobile devices before and after the association was created could be used to target ads to the STB, regardless of the IP addresses used by the computers and mobile devices (such as cell phones) to access the web at the time the profiles were collected.

For example, consider a common scenario where a laptop, used both at home and in the office, is linked to a home STB as a result of it being used at home. The day after the association was created, the laptop is taken to work, where it is used to visit a home mortgage site (using a different LAN or online access device than the one used at home). The home mortgage site redirects the laptop to the CAS along with a request to transmit a mortgage-related TV ad from one of the site's advertisers to the laptop user. The CAS, reading its own cookie that was placed on the laptop, checks its database and finds that the laptop is linked to a certain STB. In the evening, when the laptop user returns home and turns on the TV, the user will see the mortgage-related TV ad, even if the user left the laptop at work that day.

In another example, suppose a laptop user using a laptop at work one morning views a home mortgage advertiser's ad, before any association between the laptop and a home STB is created. When the mortgage advertiser ad server redirects the laptop to the CAS with a request to transmit a TV advertisement to the user, the CAS places a cookie on the laptop, or reads its own cookie if it encountered the laptop before. The CAS, finding no association between the laptop and a STB, stores the IP address used to view the advertiser's online ad, the CAS cookie used to mark the laptop, the date and time the ad was viewed, and a link (e.g., a URL) to the advertiser's TV ad. In the afternoon, suppose the laptop user returns home with the laptop. When the user accesses the Internet via the home's LAN with the laptop, suppose the user visits a travel site interested in delivering travel-related TV ads to the user from the site's advertisers. When the travel site redirects the laptop to the CAS, the CAS reads its own cookie and records the IP address used by the laptop to access the travel site, the CAS cookie used to mark the laptop, the date and time the site was visited, and links to TV ads (sold by the site to its travel advertisers). Next, the home STB is in contact with the CAS in the evening to check whether there are any TV ads available for its user. The CAS then uniquely identifies the STB using a tag it previously placed on the STB and recognizes that the STB is using the same IP address as the STB did several days ago. The CAS checks which profile providers were visited by computers and mobile devices using the same IP address since the STB's last contact. The CAS finds the laptop visit to the travel site using the common IP address. The CAS further finds the laptop's view of the online mortgage advertiser's ad, using the cookie used by the CAS to mark the laptop. The CAS can then redirect the STB to fetch the mortgage TV ad, using the link provided by the mortgage advertiser (despite the fact that the online mortgage ad was viewed by the laptop before making the association with the home STB) and redirect the STB to fetch the travel TV ads from the links provided by the travel site.

An Internet site can determine in one of several ways which CAS to contact to arrange for targeted delivery of television advertisements to a visitor of the online site:

(i) Each ISP (or ISP/TVP) has a block of IP addresses from which it dynamically allocates IP addresses to users using DHCP. Based on the online access IP address of a visitor to the site, an Internet site can determine which ISP the visitor is using to access the site. The site can then transmit a request to the correct CAS for that ISP. The request could be transmitted by redirecting the user to the correct CAS, for example.

(ii) The CAS or the CAS owner can transmit to participating Internet sites a file that includes a list of online access IP addresses that the CAS currently recognizes. Updated files can be transmitted at suitable intervals. An Internet site can receive such files from multiple CASs, and according to the information in the files can determine the proper CAS from which to request that an ad be served to the Internet site visitor.

(iii) The Internet site can request ads from all or most major CASs, relying on the probability that at least one of them may have registered the IP address allocated to the site visitor by the ISP that provides the site visitor's online access. If that is the case, that CAS can transmit to the Internet site a confirmation that the CAS recognizes the site visitor's online access IP address. The Internet site can deliver its request by redirecting a visitor to all or most major ISPs that operate a CAS, for example, or by sending all or most of the major CAS servers a file with the IP addresses and corresponding times and dates of visitors to the site.

The CAS that receives a request to deliver a television ad to an Internet site visitor might already have electronically associated an STB IP address with the visitor's online access IP address. If not, the CAS can store the site visitor's online IP address, the identity of the requesting Internet site, and the time and date of the visit to the Internet site. If the site visitor's STB later accesses the Internet server and the ISP/TVP transmits the site visitor's STB IP address to the CAS, the CAS can then arrange delivery of requested television ads. Or if the site visitor's STB reports a common IP address that matches the site visitor's IP address, the CAS can then arrange delivery of requested television ads.

Although the CAS is described as an entity separate from the profile provider, it could well be owned by or otherwise controlled by the profile provider. For example, if a profile provider is an online site (a large site such as Google could be a good example), in that implementation no redirect (or other inter-party communication) to the CAS will be required because the CAS is the server collecting the profile on behalf of the online site. For example, Google's CAS could collect the IP addresses of users who search on Google, what those users search for, at what times and dates the searches took place, and possibly the Google cookies used to mark those users' computers. Due to the very large amount of profile information about so many people accumulated by Google, the Google CAS could be used to serve TV ads to STBs. An STB communicates with the Google CAS to check whether a STB user has used another computer or mobile device to search on Google (the Google CAS uses the STB's common IP address to find those other computers or mobile devices, as explained above), and if Google finds such searches were made, it arranges for delivery of targeted TV ads, sold by Google to its advertisers, to the STB of users who made such searches.

As a security precaution, many residential or home office network routers are set by default to block access from the Internet to devices connected to router. In this default mode, television advertisements can be transmitted to the STB through the modem/router only upon if an initiated request is transmitted by the STB. The STB can be configured to query the CAS periodically for television ads awaiting transmission to the STB, and in response the CAS can either transmit the ad or direct the STB to retrieve the ad from the accessed online site or from another online site or ad server. Alternatively, enabling "Port Forwarding" on the router would allow direct access from the Internet to a STB connected to the Internet through the modem/router, thereby enabling the CAS or online site to transmit, at its own initiative, an advertisement to the STB.

However the transmission of the advertisement is initiated, and whatever the source of the transmitted advertisement, the STB can save the advertisement (in its own memory or storage or in a DVR) for viewing at a later time by the user (perhaps repeatedly), or the advertisement can be presented in "real-time" or "streaming" format. The advertisement (stored or real-time) can be presented independently, or can be integrated into other television content. Any suitable procedures for transmitting the targeted television advertisement to the online user's STB can be employed.

An online site or other profile provider can provide to the CAS a profile of a visitor, in return for a fixed payment or a commission based on revenue generated by a television advertisement transmitted to the profiled visitor. In such a case the transmission request received by the CAS from the profile provider includes the visitor's profile (searches performed, pages viewed, provided demographic attributes, etc.; typically not PII). The CAS can match the profile with one or more other television advertisements to be delivered to the visitor's STB (in addition to those requested by the online site). Such additional ads can be sold by the CAS or by another party, and can be transmitted directly from the CAS or pulled by the STB from another site or ad server to which the CAS redirects the STB.

As described previously herein, it is often the case that more than one computer or other online user interface device is connected to the Internet through a single modem or router, and all devices sharing that connection will appear to an online site to be connected through the same IP address at any given time. For example, in a home scenario, a parent and a child in the same household might each use their own computer to access the Internet, with the parent visiting sites pertaining to news or finance and the child visiting sites pertaining to pop music or television. (The same is true in a business setting, where many computers may access websites through a common modem or router.) Each such site visited by any person on the LAN reports to the CAS the IP addresses and corresponding times and dates of each of those visits (which are the same at any given time for both computers). The STB in the same household reports to the CAS the common IP address used for online access. The CAS can now match the STB to the various sites visited. Television advertisements can be selected based not only on requests made by the visited sites (as already described) but also on content being viewed on the television when the TV advertisement is delivered. For example, if programming is being viewed on the television that is typically targeted at adults (e.g., news, financial reports, or adult drama) then television advertisements requested by the news or finance online sites are presented. Alternatively, if programming is being viewed on the television that is more typically targeted at children or teenagers, then television advertisements requested by the pop music or fashion online sites are presented. Both types of ads can be directed to the STB and stored for later viewing (during viewing of suitable television content) or can be directed to the STB and viewed as the suitable television content is viewed. The same discrimination between types of sites visited using multiple online access devices can be employed regardless of whether the computers in the household are fixed or mobile devices, through the techniques discussed previously herein.

In another implementation, the CAS arranges for delivery of TV ads to the STB along with associated television program targeting criteria, such as targeted age (kid, teen, adult, or senior), targeted gender, or type of content (travel, finance, news, or other subjects). The STB chooses the TV program within which to serve each of the delivered ads based on comparing the television program targeting criteria to actual program characteristics. Program characteristics can be ascertained by virtue of their being included in the electronic TV guide available to the STB or sent with the program as accompanying embedded data, for example, using known or later-discovered techniques. In a variation, when the STB delivers a television program to the user, or when the television program is about ready to show an advertisement, the STB can connect with the CAS and report to the CAS the identity of the viewed program, and the CAS can respond with an instruction identifying which of the ads stored in the STB (previously delivered from the CAS to the STB) should be delivered during the viewed program, based on comparing the characteristics of the program being viewed with the targeting criteria.

The television advertisements directed to users' set-top boxes at the request of a profile provider can come from a variety of sources. In one example, a given profile provider can request that the CAS direct an advertisement to the user's STB from (or on behalf of) the profile provider itself (if, for example, the profile provider is an online advertiser site interested in delivering TV ads to people that visited its online site) or from (or on behalf of) a related site (perhaps a site in the same Internet domain as the given profile provider). In that example, the proprietor of the CAS, as the facilitator of the targeted TV ad delivery based on the online site visit, can receive a payment from the profile provider. The CAS proprietor can keep a share of revenue as a commission and pay the TVP for the ad space (except in the case where the CAS proprietor owns the ad space). The TVP can either retain the entire amount paid by the CAS proprietor, if the TVP owns the TV ad space within which the TV ad was delivered, or the TVP can pay some or all of the amount paid by the CAS proprietor to another entity such as a TV broadcasting network, if the TVP does not own the ad space. In the case where the STB is provided by a third party other than the TVP (such as a service provider like Tivo), the STB provider can arrange with content owners (such as a TV broadcasting network) to have the service provider's STBs replace broadcasted TV ads with targeted TV ads, where a targeted TV ad is available, and the service provider and the TV broadcasting network can share the revenue with the CAS proprietor as discussed above. In some cases, the CAS can be owned by a TVP, an ISP, an STB provider, an online site, a TV ad space owner, or a TV content provider, in which case the payments will be divided in accordance to the respective roles. In general, a payment from a TV advertiser is used to pay the TV ad space owner and the entities facilitating the delivery of the targeted TV ad.

In another example, the online site or other profile provider can request that an ad from another advertiser of its own choosing be directed to the user's STB to whom the online site has sold an amount of television advertising space. The online site generates a new revenue stream by selling TV ads to its advertisers, where the TV ads are delivered to members of the online site's audience while they watch TV. In that example the online site can collect a revenue amount from the site-chosen advertiser while paying the CAS, ISP, TVP, ISP/TVP, or TV ad space owner in return for assisting to facilitate delivery to the STB of the ad provided by the site-chosen advertiser.

In another example, the profile provider provides a profile to the CAS in return for a payment triggered (1) every time the provided profile (whether including behavioral or demographic data) is used to deliver a TV ad, (2) when a TV ad that has been delivered using the provided profile generates revenues, or (3) simply on account of delivery of the profile without regard to whether, how often, or how effectively it is used.

The TV advertisement itself can be sold by the CAS, ISP, TVP, ISP/TVP, STB provider, TV ad space owner, or any third party such as a re-seller or a firm that represents ad space owners or profile providers and sells to advertisers. In that example the profile provider can collect a revenue amount from any of the entities benefiting from the delivery of the TV ad based on the profile provided by the profile provider, including the TV ad space owner, STB provider, CAS, ISP, TVP, ISP/TVP, or a third party selling the targeted ad space. The profile provider, re-seller, or the other advertisers can also pay a revenue amount to the CAS, ISP, TVP, or ISP/TVP in return for directing the ad to the STB.

The systems and methods disclosed herein can be used to generate revenue in a variety of ways for various of the involved entities, not limited to the examples given here, that fall within the scope of the present disclosure or appended claims. It should be noted that the terms "pay," "collect," "receive," and so forth, when referring to revenue amounts, can denote actual exchanges of funds or can denote credits or debits to electronic accounts, especially automatic payment implemented with computer tracking. The terms can apply whether the payments are characterized as commissions, royalties, referral fees, holdbacks, overrides, purchase-resales, or any other compensation arrangements giving net results of split advertising revenues as stated above. Payment can occur either immediately, such as through micro-payment transfers, periodically, such as daily, weekly, or monthly, or upon accumulation of payments from multiple events totaling above a threshold amount. The systems and methods disclosed herein can be implemented with any suitable accounting modules or subsystems for tracking such payments or receipts of funds.

The systems and methods disclosed herein can be implemented as general or special purpose computers or other programmable hardware devices programmed through software or as hardware or equipment "programmed" through hard wiring, or a combination of the two. Computer programs or other software, if used, can be implemented in temporary or permanent storage or in replaceable media, such as by including programming in microcode, object-oriented code, web-based or distributed software modules that operate together, RAM, ROM, CD-ROM, DVD-ROM, hard drives, thumb drives, flash memory, optical media, magnetic media, semiconductor media, or any future storage alternatives.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims. For example, where the term "product" is used in connection with a shopping or purchase request, the product can be a physical product, intangible product, or a service.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either...or," "only one of...," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," and "having," and variants thereof, shall be construed as open ended terminology, with the same meaning as if the phrase "at least" were appended after each instance thereof.

What is claimed is:

1. A system for taking action using cross-device profile information comprising:
(a) a first computerized device programmed to electronically send over the Internet an automatic communication, which communication contains (i) a first device identifier identifying the first computerized device and (ii) information identifying content accessed with the first computerized device by a user of the first computerized device;
(b) a computer system programmed to perform an automatic action using:
(i) the first device identifier,
(ii) the information in part (a)(ii), and
(iii) electronically stored profile information accessible to the computer system, wherein the profile information has been collected over the Internet via a second computerized device;
(c) wherein the computer system has access to an electronic database containing a multitude of associations, each indicating an association between device identifiers of two or more Internet-accessing electronic devices of a multitude of Internet-accessing electronic devices, and wherein one of the multitude of associations in the electronic database contains indicia of a first association between the first device identifier of the first computerized device and a second device identifier of the second computerized device;
(d) wherein the first association has been determined, prior to receipt by the computer system of the first device identifier and the information in part (a)(ii), by using stored data relating to Internet access by various of the multitude of Internet-accessing electronic devices to determine that both of the first computerized device and the second computerized device have accessed the Internet via a common IP address at respective times satisfying a predetermined time-relation criterion; and
(e) wherein the first association is determined by a computer that (i) accesses the Internet without using the common IP address, (ii) does not use personally identifiable information of the user of the first computerized device to determine the first association, and (iii) does not use personally identifiable information of a user of the second computerized device to determine the first association.

2. The system of claim 1 wherein the first computerized device is a television set-top box.

3. The system of claim 2 wherein the second computerized device is an online user interface device.

4. The system of claim 1 wherein the second computerized device is a mobile device that accessed the Internet both via the common IP address and via at least one different IP address, and wherein the profile information was collected when the mobile device accessed the Internet other than via the common IP address.

5. The system of claim 4 wherein the profile information was collected via the mobile device after the first association has been determined.

6. The system of claim 1 wherein the first device identifier does not include personally identifiable information pertaining to the user of the first computerized device and the second device identifier does not include personally identifiable information pertaining to the user of the second computerized device.

7. The system of claim 1 wherein at least one of the first device identifier and the second device identifier is stored in a cookie readable by the computer system.

8. The system of claim 1 wherein at least one of the first device identifier and the second device identifier includes an IP address.

9. The system of claim 1 wherein the profile information is behavioral profile information.

10. The system of claim 9 wherein the behavioral profile information includes an indication of a search query entered at the second computerized device by the user of the second computerized device.

11. The system of claim 9 wherein the behavioral profile information includes an indication of television content accessed using the second computerized device by the user of the second computerized device.

12. The system of claim 11 wherein (A) at least one of the first device identifier and the second device identifier is stored in a cookie readable by the computer system, and (B) the first computerized device is programmed to send the automatic communication of part (a) by URL redirection in response to select activity with respect to the first computerized device by the user of the first computerized device.

13. The system of claim 1 wherein the automatic communication in part (a) uses the common IP address.

14. The system of claim 1 wherein a first service provider provides television service to a user of both the first computerized device and the second computerized device and a second service provider different from the first service provider provides Internet access to both the first computerized device and the second computerized device.

15. The system of claim 1 wherein the automatic action comprises causing the first computerized device to display an advertisement, which advertisement has been selected from among a plurality of possible advertisements based at least in part on at least a portion of the profile information collected via the second computerized device.

16. The system of claim 1 wherein the first computerized device is programmed to send the automatic communication of part (a) by URL redirection.

17. The system of claim 1 wherein the first computerized device is programmed to send the automatic communication of part (a) in response to select activity with respect to the first computerized device by the user of the first computerized device.

18. The system of claim 1 wherein the first computerized device is programmed to send the communication of part (a) directly to the computer system.

19. The system of claim 1 wherein the stored data relating to Internet access by various of the multitude of Internet-accessing electronic devices comprises a multitude of records, each comprising (A) a device identifier of one of the Internet-accessing electronic devices, (B) an IP address through which the one of the Internet-accessing electronic devices accessed the Internet, and (C) a timestamp identifying when the one of the Internet-accessing electronic devices accessed the Internet.

20. The system of claim 1 wherein the predetermined time-relation criterion comprises the criterion that one of the first computerized device and the second computerized device accessed the Internet within a specified length of time after a time when the other of the first computerized device and the second computerized device accessed the Internet.

21. The system of claim 1 wherein the predetermined time-relation criterion comprises the criterion that one of the first computerized device and the second computerized device accessed the Internet between two times when the other of the first computerized device and the second computerized device accessed the Internet.

22. The system of claim 21 wherein (A) the first computerized device is a television set-top box; and (B) at least one of the first device identifier and the second device identifier is stored in a cookie readable by the computer system.

23. The system of claim 1 wherein the computer system of part (b) includes the computer of part (e).

24. The system of claim 1 wherein the information identifying accessed content of part (a)(ii) comprises the identity of a television program.

25. The system of claim 24 wherein the first computerized device is a television set-top box.

26. The system of claim 25: (A) wherein the second computerized device is a mobile device that accessed the Internet both via the common IP address and via at least one different IP address; (B) wherein the profile information was collected when the mobile device accessed the Internet other than via the common IP address; and (C) wherein the profile information was collected via the mobile device after the first association has been determined.

27. The system of claim 1 wherein (A) the first computerized device is a television set-top box; (B) the second computerized device is a mobile device; (C) the first device identifier does not include personally identifiable information pertaining to the user of the television set-top box and the second device identifier does not include personally identifiable information pertaining to the user of the mobile device; (D) the profile information is behavioral profile information; (E) the automatic communication in part (a) uses the common IP address; and (F) the automatic action comprises causing the television set-top box to display an advertisement, which advertisement has been selected from among a plurality of possible advertisements based at least in part on at least a portion of the behavioral profile information collected via the mobile device.

* * * * *